(12) United States Patent
Arimilli et al.

(10) Patent No.: US 8,255,913 B2
(45) Date of Patent: Aug. 28, 2012

(54) NOTIFICATION TO TASK OF COMPLETION OF GSM OPERATIONS BY INITIATOR NODE

(75) Inventors: Lakshminarayana B. Arimilli, Austin, TX (US); Robert S. Blackmore, Poughkeepsie, NY (US); Gheorghe C. Cascaval, Carmel, NY (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1238 days.

(21) Appl. No.: 12/024,427

(22) Filed: Feb. 1, 2008

(65) Prior Publication Data

US 2009/0199191 A1 Aug. 6, 2009

(51) Int. Cl.
*G06F 9/46* (2006.01)
(52) U.S. Cl. .......................... 718/103; 718/100; 718/102
(58) Field of Classification Search .......................... None
See application file for complete search history.

(56) References Cited

U.S. PATENT DOCUMENTS

| | | | |
|---|---|---|---|
| 4,204,113 A | 5/1980 | Girand et al. | |
| 4,704,606 A | 11/1987 | Hasley | |
| 4,999,834 A | 3/1991 | Leo et al. | |
| 5,016,169 A | 5/1991 | Koya et al. | |
| 5,261,067 A | 11/1993 | Whelan | |
| 5,408,650 A | 4/1995 | Arsenault | |
| 5,604,882 A | 2/1997 | Hoover | |
| 5,617,537 A | 4/1997 | Yamada | |
| 5,640,504 A * | 6/1997 | Johnson, Jr. .................... | 714/4.4 |
| 5,682,512 A | 10/1997 | Tetrick | |
| 5,706,434 A | 1/1998 | Kremen et al. | |
| 5,729,714 A | 3/1998 | Dei | |
| 5,765,146 A * | 6/1998 | Wolf et al. ............................. | 1/1 |
| 5,887,138 A * | 3/1999 | Hagersten et al. ............ | 709/215 |
| 5,900,020 A | 5/1999 | Safranek et al. | |
| 5,918,229 A | 6/1999 | Davis et al. | |

(Continued)

FOREIGN PATENT DOCUMENTS

WO WO 9832077 7/1998

(Continued)

OTHER PUBLICATIONS

Raicu et al., Falkon: a Fast and Light-weight tasK executioN frameworK; Nov. 10-16, 2007; ACM, pp. 1-12.*

(Continued)

*Primary Examiner* — Jennifer To
*Assistant Examiner* — Abu Z Ghaffari
(74) *Attorney, Agent, or Firm* — Yudell Isidore Ng Russell PLLC

(57) ABSTRACT

In a global shared memory (GSM) environment, a method provides local notification of completion of a global shared memory (GSM) operation processed by a first task executing at a local node of the distributed system. The system includes multiple nodes on which different tasks of a single job execute and perform GSM operations that are received from a second task via a via host fabric interface (HFI) and associated HFR window assigned to the first tasks. The local task initiates execution of a GSM operation on the local node. The task then monitors for and detects a completion of the execution of the GSM operation on the local node. When the task detects completion of the execution of the GSM operation, the task issues an internal notification to inform the locally-executing tasks of the completion of the GSM operation.

12 Claims, 13 Drawing Sheets

U.S. PATENT DOCUMENTS

| | | |
|---|---|---|
| 5,940,870 A | 8/1999 | Chi et al. |
| 6,003,123 A | 12/1999 | Carter et al. |
| 6,128,672 A | 10/2000 | Lindsley |
| 6,181,704 B1 | 1/2001 | Drottar et al. |
| 6,205,498 B1 | 3/2001 | Habusha et al. |
| 6,256,715 B1 | 7/2001 | Hansen |
| 6,275,900 B1 | 8/2001 | Liberty |
| 6,446,185 B2 | 9/2002 | Hagersten |
| 6,574,721 B1 | 6/2003 | Christenson et al. |
| 6,594,736 B1 | 7/2003 | Parks |
| 6,598,130 B2 * | 7/2003 | Harris et al. ............... 711/147 |
| 6,628,615 B1 | 9/2003 | Joseph et al. |
| 6,665,758 B1 | 12/2003 | Frazier et al. |
| 6,668,299 B1 | 12/2003 | Kagan et al. |
| 6,721,948 B1 * | 4/2004 | Morgan ...................... 718/102 |
| 6,738,889 B2 | 5/2004 | Godtland et al. |
| 6,760,783 B1 | 7/2004 | Berry |
| 6,775,719 B1 | 8/2004 | Leitner |
| 6,799,200 B1 | 9/2004 | Blackmore et al. |
| 6,826,653 B2 | 11/2004 | Duncan |
| 6,826,660 B2 | 11/2004 | Hagersten et al. |
| 6,829,666 B1 | 12/2004 | Deneroff |
| 6,859,867 B1 | 2/2005 | Berry |
| 6,928,529 B2 | 8/2005 | Shinomiya |
| 6,948,004 B2 | 9/2005 | Gasbarro |
| 6,952,722 B1 | 10/2005 | Podila et al. |
| 6,981,125 B2 | 12/2005 | Emmes |
| 7,149,873 B2 | 12/2006 | Mohideen et al. |
| 7,181,541 B1 | 2/2007 | Burton |
| 7,213,081 B2 | 5/2007 | Narasimhamurthy et al. |
| 7,307,710 B2 | 12/2007 | Gatsios |
| 7,356,666 B2 | 4/2008 | Kanai et al. |
| 7,360,028 B1 | 4/2008 | Tremblay |
| 7,447,867 B2 | 11/2008 | Soja et al. |
| 7,464,115 B2 | 12/2008 | Carter et al. |
| 7,509,646 B1 * | 3/2009 | Maw et al. .................. 718/105 |
| 7,533,238 B2 | 5/2009 | Burns et al. |
| 7,590,983 B2 * | 9/2009 | Neiman et al. ............. 718/100 |
| 7,631,128 B1 | 12/2009 | Sgrosso et al. |
| 7,797,588 B2 | 9/2010 | Arimilli et al. |
| 7,814,166 B2 | 10/2010 | Suzuoki |
| 7,844,746 B2 | 11/2010 | Arimilli et al. |
| 7,853,777 B2 * | 12/2010 | Jones et al. ................. 712/214 |
| 7,873,879 B2 | 1/2011 | Arimilli et al. |
| 7,877,436 B2 | 1/2011 | Arimilli et al. |
| 7,921,261 B2 | 4/2011 | Blackmore et al. |
| 7,925,842 B2 | 4/2011 | Arimilli et al. |
| 7,966,454 B2 | 6/2011 | Arimilli et al. |
| 2001/0013089 A1 | 8/2001 | Weber |
| 2001/0027512 A1 | 10/2001 | Hagersten |
| 2002/0023069 A1 * | 2/2002 | Blank et al. .................. 707/1 |
| 2002/0032844 A1 | 3/2002 | West |
| 2002/0042868 A1 | 4/2002 | Godtland et al. |
| 2002/0071450 A1 | 6/2002 | Gasbarro |
| 2002/0078271 A1 | 6/2002 | Berry |
| 2002/0087813 A1 | 7/2002 | Harris et al. |
| 2002/0184476 A1 | 12/2002 | McKenney |
| 2003/0002590 A1 | 1/2003 | Kaku |
| 2003/0009640 A1 | 1/2003 | Arimilli et al. |
| 2003/0014516 A1 | 1/2003 | Blackmore et al. |
| 2003/0069938 A1 | 4/2003 | Russell |
| 2003/0069939 A1 | 4/2003 | Russell |
| 2003/0163642 A1 | 8/2003 | Borkenhagen et al. |
| 2003/0236848 A1 * | 12/2003 | Neiman et al. ............. 709/213 |
| 2004/0059790 A1 | 3/2004 | Austin-Lane |
| 2004/0064601 A1 | 4/2004 | Swanberg |
| 2004/0098447 A1 | 5/2004 | Verbeke et al. |
| 2004/0107265 A1 | 6/2004 | Yasunaga |
| 2004/0107419 A1 | 6/2004 | Blackmore et al. |
| 2004/0146070 A1 | 7/2004 | Blackmore et al. |
| 2004/0181522 A1 | 9/2004 | Jardin |
| 2004/0181523 A1 | 9/2004 | Jardin |
| 2004/0181524 A1 | 9/2004 | Jardin |
| 2004/0186832 A1 | 9/2004 | Jardin |
| 2004/0260906 A1 | 12/2004 | Landin et al. |
| 2005/0071772 A1 | 3/2005 | Jaeger |
| 2005/0091439 A1 | 4/2005 | Mohideen et al. |
| 2005/0108715 A1 | 5/2005 | Kanai et al. |
| 2005/0147114 A1 | 7/2005 | Stewart et al. |
| 2005/0149903 A1 | 7/2005 | Archambault |
| 2005/0188373 A1 | 8/2005 | Inoue |
| 2005/0238035 A1 | 10/2005 | Riley |
| 2006/0045109 A1 | 3/2006 | Blackmore et al. |
| 2006/0069878 A1 | 3/2006 | Aguilar et al. |
| 2006/0075197 A1 | 4/2006 | Shimada |
| 2006/0126770 A1 | 6/2006 | Yamazaki |
| 2006/0143389 A1 | 6/2006 | Kilian et al. |
| 2006/0179255 A1 | 8/2006 | Yamazaki |
| 2007/0033592 A1 | 2/2007 | Roediger et al. |
| 2007/0050763 A1 | 3/2007 | Kagan et al. |
| 2007/0073826 A1 | 3/2007 | Isani |
| 2007/0073976 A1 | 3/2007 | Chitlur et al. |
| 2007/0076649 A1 | 4/2007 | Lin |
| 2007/0124355 A1 | 5/2007 | Johns et al. |
| 2007/0180161 A1 | 8/2007 | Asada |
| 2007/0243867 A1 | 10/2007 | Graves et al. |
| 2008/0069125 A1 | 3/2008 | Reed et al. |
| 2008/0091886 A1 | 4/2008 | Terakawa et al. |
| 2009/0153897 A1 * | 6/2009 | Blackmore et al. .......... 358/1.15 |
| 2009/0157996 A1 | 6/2009 | Arimilli et al. |
| 2009/0158298 A1 | 6/2009 | Saxena et al. |
| 2009/0198837 A1 | 8/2009 | Arimilli et al. |
| 2009/0198971 A1 | 8/2009 | Arimilli et al. |
| 2009/0199182 A1 | 8/2009 | Arimilli et al. |
| 2009/0199194 A1 | 8/2009 | Arimilli et al. |
| 2010/0070675 A1 | 3/2010 | Yamazaki |

FOREIGN PATENT DOCUMENTS

| | | |
|---|---|---|
| WO | WO 2005015428 | 2/2005 |
| WO | WO 2007105373 | 9/2007 |

OTHER PUBLICATIONS

U.S. Appl. No. 12/024,367, "Mechanisms to Order Global Shared Memory Operations", Non-Final Office Action dated Dec. 21, 2010.

U.S. Appl. No. 12/024,367, "Mechanisms to Order Global Shared Memory Operations", Final Office Action dated Jun. 8, 2011.

U.S. Appl. No. 12/024,397, "Host Fabric Interface (HFI) to Perform Global Shared Memory (GSM) Operations," Non-Final Office Action dated Mar. 30, 2011.

US Patent No. 7921261, "Reserving a Global Address Space," Non-Final Office Action dated Jul. 22, 2010.

US Patent No. 7921261, "Reserving a Global Address Space," Notice of Allowance dated Nov. 18, 2010.

U.S. Appl. No. 12/024,664, "Generating and Issuing Global Shared Memory Operations Via a Send FIFO," Non-Final Office Action dated Oct. 26, 2010.

U.S. Appl. No. 12/024,664, "Generating and Issuing Global Shared Memory Operations Via a Send FIFO," Final Office Action dated May 4, 2011.

Reasoning About Code Mobility with Mobile UNITY, Picco, GP.et al.; 2001.

Automatic Network Generation for System-on-Chip Communication Design, Shin, D.et al. ; 2005.

U.S. Appl. No. 12/024,678, "Mechanism for Guaranteeing Delivery of Multi-Packet GSM Message," Non-Final Office Action dated Apr. 26, 2011.

US Patent No. 7844746, "Accessing an Effective Address and Determining Whether the Effective Address is Associated with Remotely Coupled I/O Adapters," Non-Final Office Action dated Mar. 10, 2010.

US Patent No. 7844746, "Accessing an Effective Address and Determining Whether the Effective Address is Associated with Remotely Coupled I/O Adapters," Notice of Allowance dated Jul. 21, 2010.

US Patent No. 7925842, "Allocating a Global Shared Memory," Non-Final Office Action dated Aug. 30, 2010.

US Patent No. 7925842, "Allocating a Global Shared Memory," Notice of Allowance dated Dec. 9, 2010.

US Patent No. 7966454, "Issuing Global Shared Memory Operations Via Direct Cache Injection to a Host Fabric Interface," Non-Final Office Action dated Oct. 25, 2010.

US Patent No. 7966454, "Issuing Global Shared Memory Operations Via Direct Cache Injection to a Host Fabric Interface," Notice of Allowance dated Feb. 14, 2011.

US Patent No. 7877436, "Mechanism to Provide Reliability Through Packet Drop Detection," Non-Final Office Action dated May 5, 2010.
US Patent No. 7877436, "Mechanism to Provide Reliability Through Packet Drop Detection," Notice of Allowance dated Sep. 17, 2010.0.
US Patent No. 7873879, "Mechanism to Perform Debugging of Global Shared Memory (GSM) Operations," Non-Final Office Action dated May 11, 2010.
US Patent No. 7873879, "Mechanism to Perform Debugging of Global Shared Memory (GSM) Operations," Notice of Allowance dated Sep. 10, 2010.
US Patent No. 7797588, "Mechanism to Provide Software Guaranteed Reliability for GSM Operations," Notice of Allowance dated May 14, 2010.
U.S. Appl. No. 12/024,678, "Guaranteeing Delivery of Multi-Packet GSM Messages," Notice of Allowance dated Dec. 2, 2011.
U.S. Appl. No. 12/024,664, "Generating and Issuing Global Shared Memory Operations via a Send FIFO," Advisory Action dated Sep. 26, 2011.
U.S. Appl. No. 12/024,397, "Host Fabric Interface (HFI) to Perform Global Shared Memory (GSM) Operations," Non-Final Office Action dated Feb. 2, 2012.

U.S. Appl. No. 12/024,410, "Mechanism to Prevent Illegal Access to Task Address Space by Unauthorized Tasks," Non-Final Office Action dated Nov. 4, 2011.
U.S. Appl. No. 12/024,651,"Notification by Task of Completion of GSM Operations at Target Node," Non-Final Office Action dated Sep. 29, 2011.
U.S. Appl. No. 12/024,651,"Notification by Task of Completion of GSM Operations at Target Node," Notice of Allowance dated Mar. 19, 2012.
U.S. Appl. No. 12/024,664, "Generating and Issuing Global Shared Memory Operations via a Send FIFO," Notice of Allowance dated Jan. 31, 2012.
U.S. Appl. No. 12/024,664, "Generating and Issuing Global Shared Memory Operations via a Send FIFO," Non-Final Office Action dated Oct. 5, 2011.
U.S. Appl. No. 12/024,367, "Mechanisms to Order Global Shared Memory Operations," Notice of Allowance dated Feb. 15, 2012.

* cited by examiner

GSM COMMAND 1000

| OP. TYPE | EA_IN | EA_T | NO. MEM. LOC. | NOTIFICATION TYPE | ... |
|---|---|---|---|---|---|

GSM PACKET/OPERATION 1020

| JOB ID | EPOCH ENTRY | NODE ID, WINDOW ID | NUMBER OF PACKETS | (SEQ, CNT) TUPLE | OP. TYPE | EA_IN | EA_T | NO. MEM. LOC. | NOTIFICATION TYPE | ... |
|---|---|---|---|---|---|---|---|---|---|---|

*Fig. 10*

NOTIFICATION TO TASK OF COMPLETION OF GSM OPERATIONS BY INITIATOR NODE

GOVERNMENT RIGHTS

This invention was made with United States Government support under Agreement No. HR0011-07-9-0002 awarded by DARPA. The Government has certain rights in the invention.

CROSS REFERENCE TO RELATED APPLICATIONS

The present application is related to the following co-pending U.S. patent applications, which are incorporated herein by reference in their entirety:

U.S. patent application Ser. No. 11/958,668, filed Dec. 18, 2007, titled "Method, System and Program Product for Reserving a Global Address Space;

U.S. patent application Ser. No. 11/958,956, filed Dec. 18, 2007, titled "Method, System and Program Product for Allocating a Global Shared Memory;"

U.S. patent application Ser. No. 12/024,437, filed Feb. 1, 2008, titled "Issuing Global Shared Memory Operations Via Direct Cache Injection to a Host Fabric Interface;"

U.S. patent application Ser. No. 12/024,367, filed Feb. 1, 2008, titled "Mechanisms to Order Global Shared Memory Operations;"

U.S. patent application Ser. No. 12/024,397, filed Feb. 1, 2008, titled "Host Fabric Interface (HFI) to Perform Global Shared Memory (GSM) Operations;"

U.S. patent application Ser. No. 12/024,410, filed Feb. 1, 2008, titled "Mechanism to Prevent Illegal Access to Task Address Space by Unauthorized Tasks;"

U.S. patent application Ser. No. 12/024,585, filed Feb. 1, 2008, titled "Mechanism to Perform Debugging of Global Shared Memory (GSM) Operations;"

U.S. patent application Ser. No. 12/024,600, filed Feb. 1, 2008, titled "Mechanism to Provide Reliability Through Packet Drop Detection;"

U.S. patent application Ser. No. 12/024,637, filed Feb. 1, 2008, titled "Mechanism to Provide Software Guaranteed Reliability for GSM Operations;"

U.S. patent application Ser. No. 12/024,651, filed Feb. 1, 2008, titled "Notification By Task of Completion of GSM Operations at Target Node;"

U.S. patent application Ser. No. 12/024,664, filed Feb. 1, 2008, titled "Generating and Issuing Global Shared Memory Operations Via a Send FIFO;" and U.S. patent application Ser. No. 12/024,678, filed Feb. 1, 2008, titled "Mechanism for Guaranteeing Delivery of Multi-Packet GSM Message."

BACKGROUND

1. Technical Field

The present invention generally relates to data processing systems and in particular to distributed data processing systems. Still more particularly, the present invention relates to data processing systems configured to support execution of global shared memory (GSM) operations.

2. Description of the Related Art

It is well-known in the computer arts that greater computer system performance can be achieved by harnessing the processing power of multiple individual processing units. Multi-processor (MP) computer systems can be designed with a number of different topologies, of which various ones may be better suited for particular applications depending upon the performance requirements and software environment of each application. One common MP computer architecture is a symmetric multi-processor (SMP) architecture in which multiple processing units, each supported by a multi-level cache hierarchy, share a common pool of resources, such as a system memory and input/output (I/O) subsystem, which are often coupled to a shared system interconnect.

Although SMP computer systems permit the use of relatively simple inter-processor communication and data sharing methodologies, SMP computer systems have limited scalability. For example, many SMP architectures suffer to a certain extent from bandwidth limitations, especially at the system memory, as the system scale increases.

An alternative MP computer system topology known as non-uniform memory access (NUMA) has also been employed to addresses limitations to the scalability and expandability of SMP computer systems. A conventional NUMA computer system includes a switch or other global interconnect to which multiple nodes, which can each be implemented as a small-scale SMP system, are connected. Processing units in the nodes enjoy relatively low access latencies for data contained in the local system memory of the processing units' respective nodes, but suffer significantly higher access latencies for data contained in the system memories in remote nodes. Thus, access latencies to system memory are non-uniform. Because each node has its own resources, NUMA systems have potentially higher scalability than SMP systems.

Regardless of whether an SMP, NUMA or other MP data processing system architecture is employed, it is typical that each processing unit accesses data residing in memory-mapped storage locations (whether in physical system memory, cache memory or another system resource) by utilizing real addresses to identifying the storage locations of interest. An important characteristic of real addresses is that there is a unique real address for each memory-mapped physical storage location.

Because the one-to-one correspondence between memory-mapped physical storage locations and real addresses necessarily limits the number of storage locations that can be referenced by software, the processing units of most commercial MP data processing systems employ memory virtualization to enlarge the number of addressable locations. In fact, the size of the virtual memory address space can be orders of magnitude greater than the size of the real address space. Thus, in a conventional systems, processing units internally reference memory locations by the virtual (or effective) addresses and then perform virtual-to-real address translations (often via one or more intermediate logical address spaces) to access the physical memory locations identified by the real addresses.

Given the availability of the above MP systems, one further development in data processing technology has been the introduction of parallel computing. With parallel computing, multiple processor nodes are interconnected to each other via a system interconnect or fabric. These multiple processor nodes are then utilized to execute specific tasks, which may be individual/independent tasks or parts of a large job that is made up of multiple tasks. In these conventional MP systems with separate nodes connected to each other, there is no convenient support for tasks associated with a single job to share parts of their address space across physical or logical partitions or nodes.

Shared application processing among different devices provides a very rudimentary solution to parallel processing. However, with each of these systems, each node operates independently of each other and requires access to the entire amount of resources (virtual address space mapped to the local physical memory) for processing any one job, making it difficult to productively scale parallel computing to a large number of nodes.

SUMMARY OF ILLUSTRATIVE EMBODIMENTS

Disclosed are a method, processing node, and computer program product for providing local notification of completion of a global shared memory (GSM) operation processed by a first task executing at a local node of a distributed system. The system includes multiple nodes on which different tasks of a single job execute and perform GSM operations that are received from a second task via a via host fabric interface (HFI) and associated HFR window assigned to the first tasks. The local task initiates execution of a GSM operation on the local node. The task then monitors for and detects a completion of the execution of the GSM operation on the local node. When the task detects completion of the execution of the GSM operation, the task issues an internal notification to inform the locally-executing tasks of the completion of the GSM operation.

In one embodiment, the task checks the header of a GSM message that provided the GSM operation for a type of notification that is required for the GSM operation. When the notification is to be locally performed, the task performs the notification only on the local node. In one embodiment, the notification is generated by the HFI when the GSM message is received and placed in the receive FIFO along with the GSM operation.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 10 is a block diagram representation of entries within an example GSM command and an example GSM packet, in accordance with one embodiment of the invention;

DETAILED DESCRIPTION OF AN ILLUSTRATIVE EMBODIMENT

Figure 1:
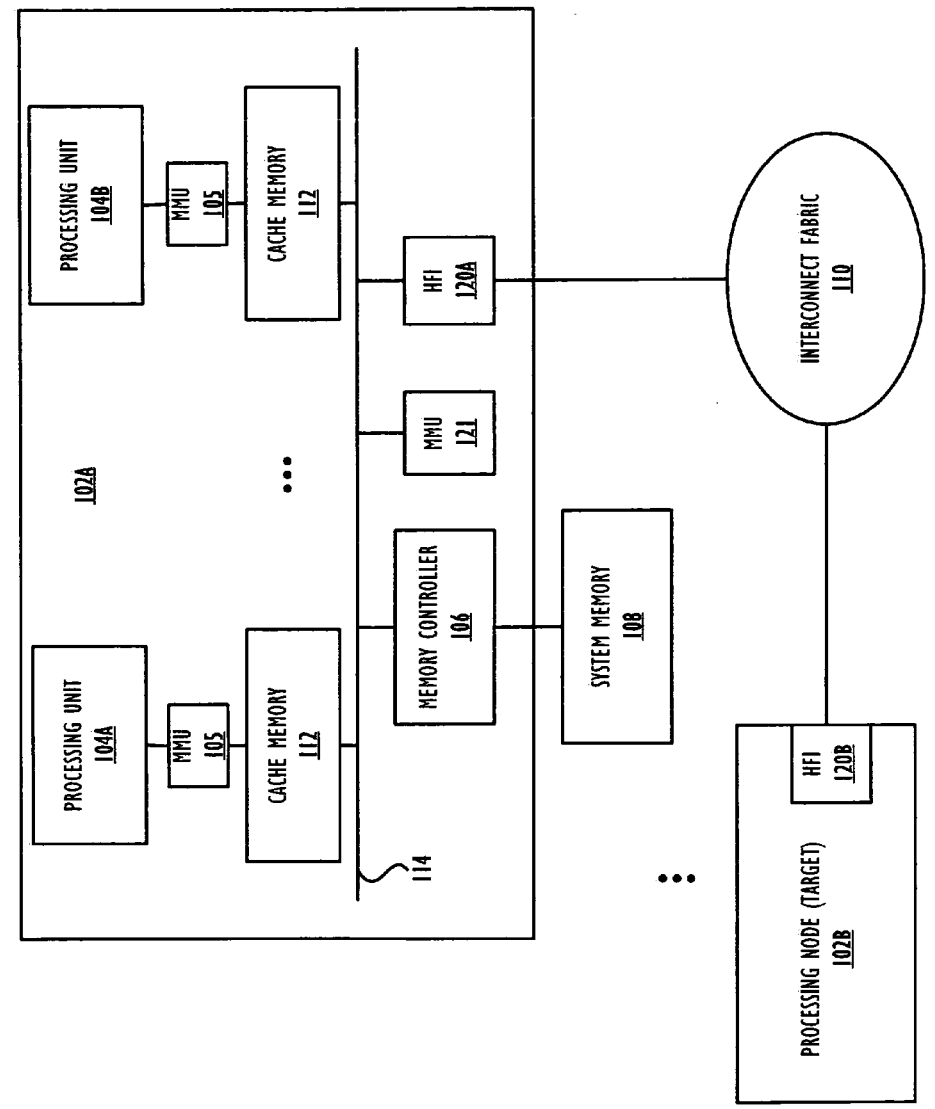
FIG. 1 illustrates an example multi-node data processing system with a host fabric interface (HFI) provided at each node to enable GSM processing across the nodes, according to one embodiment of the invention.

The illustrative embodiments provide a method and data processing system for generating and processing global shared memory (GSM) operations that complete parallel job execution of multiple tasks on different physical nodes with distributed physical memory that is accessible via a single, shared, global address space (GAS). Each physical node of the data processing system has a host fabric interface (HFI), which includes one or more HFI windows with each window assigned to at most one locally-executing task of the parallel job, although multiple windows may be assigned to a single task. The HFI includes processing logic for completing a plurality of operations that enable parallel job execution via the different tasks, each of which maps only a portion of the effective addresses (EAs) of the shared GAS to the local (real or physical) memory of that node. Each executing task within a node is assigned a window within the local HFI. The window ensures that issued GSM operations (of the local task) are correctly tagged with the job ID as well as the correct target node and window identification at which the operation is supported (i.e., the EA is memory mapped). The window also enables received GSM operations with valid EAs in the task to which the window is assigned to be processed when received from another task executing at another physical node, while preventing processing of received operations that do not provide a valid EA to local memory mapping.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the following terms, which are utilized herein, are defined as follows:

(1) Effective, virtual, and real address spaces: a user-level program uses effective addresses (EAs), which are translated into operating system (OS)-specific virtual addresses (VAs). The OS and the hardware memory management units (MMUs) translate VAs into real addresses (RAs) at the time of use.

(2) Node: the set of computing resources that form the domain of a coherent operating system (OS) image.

(3) Cluster: a collection of two or more nodes.

(4) System: the collection of all nodes in the cluster domain.

(5) Parallel Job: an application that executes on some or all the nodes in a cluster. A job is made up of tasks (processes), each of which executes in a node domain in the cluster. A parallel job has various attributes including a job ID that uniquely identifies the parallel tasks that comprise the parallel job in the entire system.

(6) Task: a single process that executes within a single effective address (EA) space. By definition, a task executes wholly within a node. However, multiple tasks in a parallel job may execute on the same node (typically proportional to the number of CPUs on the node). A task can include one or more threads of control that all view and share the same effective address (EA) space.

(7) Global shared memory (GSM)-enabled job: a parallel job, in which the component tasks have arranged to make parts of their individual effective address (EA) spaces accessible to each other via global shared memory (GSM) operations.

(8) Global address space (GAS): the union of all effective addresses (EAs) in a GSM job that are accessible to more than one task via GSM operations.

(9) Global address: an effective address within a task described as <T, EA> that is accessible to other tasks.

(10) Home: the specific node where a particular location in the global address space (GAS) is physically allocated in physical memory. Every location in the GAS has exactly one home.

As further described below, implementation of the functional features of the invention is provided within computing nodes and involves use of a combination of hardware and several software-level constructs. The presented figures illustrate both hardware and software components within an example GSM environment in which two physically separate nodes, interconnected via respective HFIs and an interconnect, provide a data processing system that executes a parallel job as individual tasks that utilize a GSM. The presentation herein of only two nodes, i.e., an initiating (sending) node and a target (receiving) node, is provided solely to simplify the description of the functionalities associated with GSM operations and the HFI. It is appreciated that this GSM functionality enables scaling to a much larger number of processing nodes within a single data processing system.

With specific reference now to the figures, and in particular to FIG. 1A, there is illustrated a high-level block diagram depicting a first view of an exemplary data processing system 100 configured with two nodes connected via respective host fabric interfaces, according to one illustrative embodiment of the invention, and within which many of the functional features of the invention may be implemented. As shown, data processing system 100 includes multiple processing nodes 102A, 102B (collectively 102) for processing data and instructions. Processing nodes 102 are coupled via host fabric interface (HFI) 120 to an interconnect fabric 110 that supports data communication between processing nodes 102 in accordance with one or more interconnect and/or network protocols. Interconnect fabric 110 may be implemented, for example, utilizing one or more buses, switches and/or networks. Any one of multiple mechanisms may be utilized by the HFI 120 to communicate across the interconnect 110. For example, and without limitation, HFI 120 may communicate via a proprietary protocol or an industry standard protocol such as Inifiniband, Ethernet, or IP (Internet Protocol).

As utilized herein, the term "processing node" (or simply node) is defined as the set of computing resources that form the domain of a coherent operating system (OS) image. For clarity, it should be understood that, depending on configuration, a single physical system may include multiple nodes. The number of processing nodes 102 deployed in a given system is implementation-dependent and can vary widely, for example, from a few nodes to many thousand nodes.

Each processing node 102 may be implemented, for example, as a single integrated circuit chip (e.g., system-on-a-chip (SOC)), a multi-chip module (MCM), or circuit board, which contains one or more processing units 104 (e.g., processing units 104A, 104B) for processing instructions and data. Further, each processing unit 104 may concurrently execute one or more hardware threads of execution.

As shown, each processing unit 104 is supported by cache memory 112, which contains one or more levels of in-line or lookaside cache. As is known in the art, cache memories 112 provide processing units 104 with low latency access to instructions and data received from source(s) within the same processing node 102*a* and/or remote processing node(s) 102*b*. The processing units 104 within each processing node 102 are coupled to a local interconnect 114, which may be implemented, for example, with one or more buses and/or switches. Local interconnect 114 is further coupled to HFI 120 to support data communication between processing nodes 102A, 102B.

As further illustrated in FIG. 1A, processing nodes 102 typically include at least one memory controller 106, which may be coupled to local interconnect 114 to provide an interface to a respective physical system memory 108. In alternative embodiments of the invention, one or more memory controllers 106 can be coupled to interconnect fabric 110 or directly to a processing unit 104 rather than a local interconnect 114.

In addition to memory controller, each processing unit 104 also includes a memory management unit (MMU) 105 to translate effective addresses to real (or physical) addresses. These MMUs 105 perform EA-to-RA translations for tasks executing on processing nodes (e.g., node 102A) of data processing system 100. However, the invention also uses a separate MMU 121, which is coupled to the local interconnect 114. MMU 121 performs EA-to-RA translations for operations received from tasks operating on remote processing nodes (e.g., node 102B) of data processing system 100. In one implementation of processor configurations, MMU 121 may be integrated with HFI 120 so as to support EA-to-RA address translations required by HFI and/or tasks utilizing HFI to complete GSM operations.

The HFI 120A and functional components thereof, which are described below, enables the task(s) executing on processing units 104a/104b to generate operations to access the physical memory 108B of other nodes that are executing other tasks of the parallel job using EAs from a shared global address space (GAS) and a GSM. Likewise, HFI 120B enables access by the task(s) on initiating node 102A to access physical memory 108B when certain criteria are met. These criteria are described below with reference to FIGS. 4 and 9

Those skilled in the art will appreciate that data processing system 100 of FIG. 1 can include many additional components, which are not illustrated herein, such as interconnect bridges, non-volatile storage, ports for connection to networks or attached devices, etc. Because such additional components are not necessary for an understanding of the present invention, they are not illustrated in FIG. 1A or 1B or discussed further herein.

Figure 2:
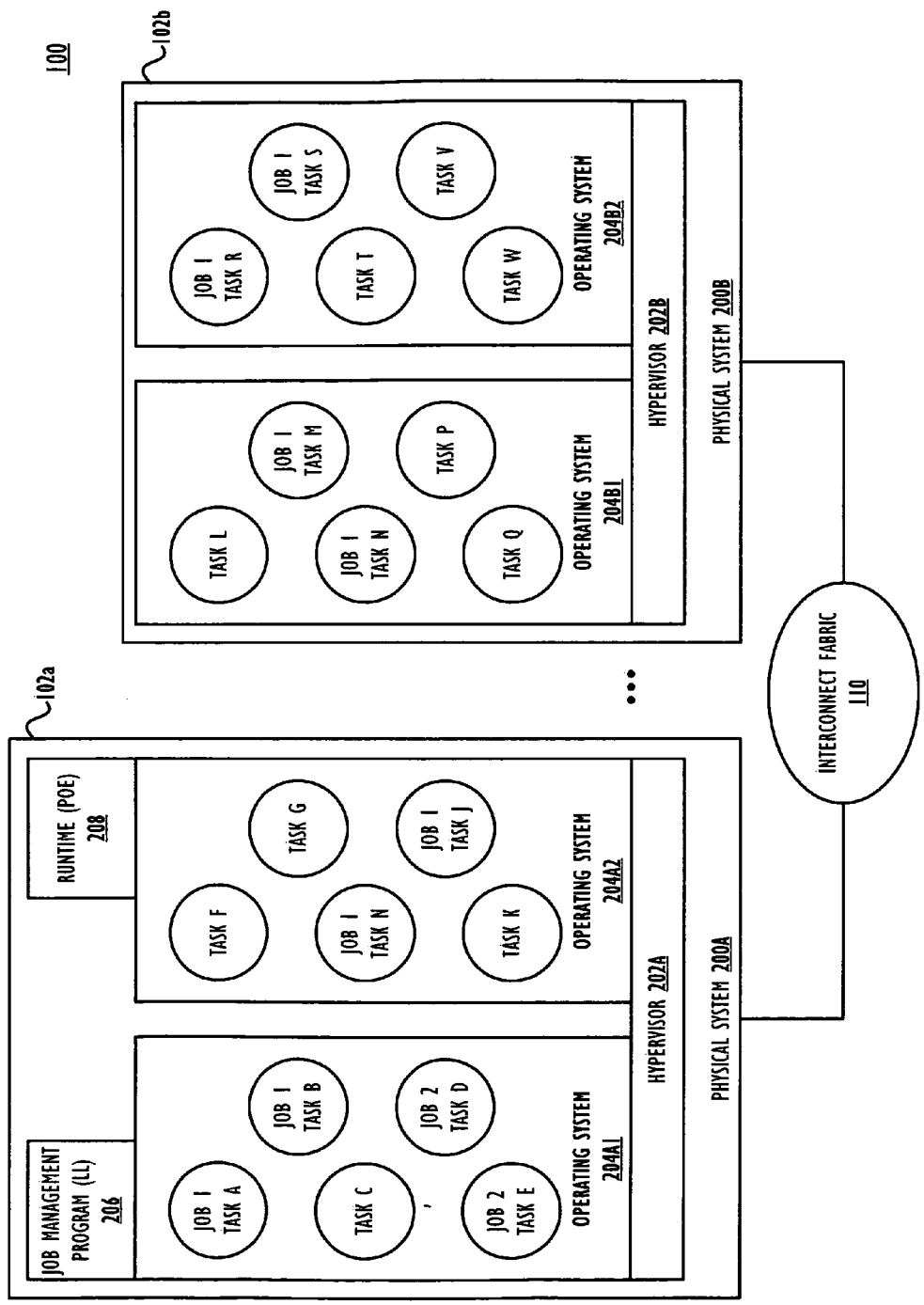
FIG. 2 illustrates the allocation of tasks of a single job across partitions and nodes within a multi-node GSM environment (such as data processing system of FIG. 1), according to one embodiment of the invention.

The above described physical representations of nodes of an example data processing systems 100 with HFIs supports the distribution of tasks associated with a parallel job across multiple nodes within a larger system with a GSM. FIG. 2 illustrates a high level view of processing multiple tasks of a parallel job within an exemplary software environment for data processing system 100, in accordance with one embodiment. In the exemplary embodiment, data processing system 100 includes at least two physical systems 200a and 200b (which respectively provide processing nodes 102a and 102b of FIG. 1) coupled by interconnect fabric 110. In the depicted embodiment, each physical system 200 includes at least two concurrent nodes. That is, physical system 200a includes a first node corresponding to operating system 204a1 and a second node corresponding to operating system 204a2. Similarly, physical system 200a includes a first node corresponding to operating system 204b1 and a second node corresponding to operating system 204b2. The operating systems 204 concurrently executing within each physical system 200 may be homogeneous or heterogeneous. Notably, for simplicity, only one node of each physical system is utilized in the descriptions of the GSM and HFI functions herein, although the features of the invention are fully applicable to tasks executing on any one of multiple nodes on a single physical system accessing physical memory of other nodes on other physical system(s).

Each physical system 200 may further include an instance of a hypervisor 202 (also referred to as a Virtual Machine Monitor (VMM)). Hypervisor 202 is a program that manages the full virtualization or para-virtualization of the resources of physical system 200 and serves as an operating system supervisor. As such, hypervisor 202 governs the creation and destruction of nodes and the allocation of the resources of the physical system 200 between nodes.

In accordance with the present invention, the execution of parallel jobs in data processing system 100 is facilitated by the implementation of a new shared memory paradigm referred to herein as global shared memory (GSM), which enables multiple nodes executing tasks of a parallel job to access a shared effective address space, referred to herein as a global address space (GAS).

Thus, under the GSM model employed by the present invention, data processing system 100 can execute multiple different types of tasks. First, data processing system 100 can execute conventional (individual) Tasks C, F, G, K, L, P, Q, T, V and W, which are independently executed under operating systems 204. Second, data processing system 100 can execute parallel jobs, such as Job 2, with tasks that are confined to a single node. That is, Tasks D and E are executed within the node corresponding to operating system 204a1 of physical system 200a and can coherently share memory. Third, data processing system 100 can execute parallel jobs, such as Job 1, that span multiple nodes and even multiple physical systems 200. For example, in the depicted operating scenario, Tasks A and B of Job 1 execute on operating system 204a1, Tasks H and J of Job 1 execute on operating system 204a2, Tasks M and N of Job 1 execute on operating system 204b1, and Tasks R and S of Job 1 execute on operating system 204b2. As is illustrated, tasks of multiple different jobs (e.g., Job 1 and Job 2) are permitted to concurrently execute within a single node.

With standard task-to-task operation, tasks running on a same node, i.e., tasks homed on the same physical device, do not need to utilize the HFI and resolve EA-to-RA mapping beyond the standard page table. The HFI and/or MMU components are thus not utilized when exchanging operations across tasks on the same physical node. Where tasks are running on different physical nodes, however, the use of the MMU and HFI is required to enable correct EA-to-RA translations for tasks homed at the specific node when issuing and/or receiving GSM operations.

Additional applications can optionally be executed under operating systems 204 to facilitate the creation and execution of jobs. For example, FIG. 2 depicts a job management program 206, such as LoadLeveler, executing under operating system 204a1 and a runtime environment 208, such as Parallel Operating Environment (POE), executing under operating system 204a2. LoadLeveler (206) and Parallel Operating Environment (208) are both commercially available products available from International Business Machines (IBM) Corporation of Armonk, N.Y. LoadLeveler (206) and POE (208) can be utilized as a convenience to the user, but are not required. However, the described embodiment provides for the availability of a privileged program to both bootstrap non-privileged executables on the cluster nodes and to enable the non-privileged executables to request and use node resources.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa.

A. Task Generation and Global Distribution

Figure 6:
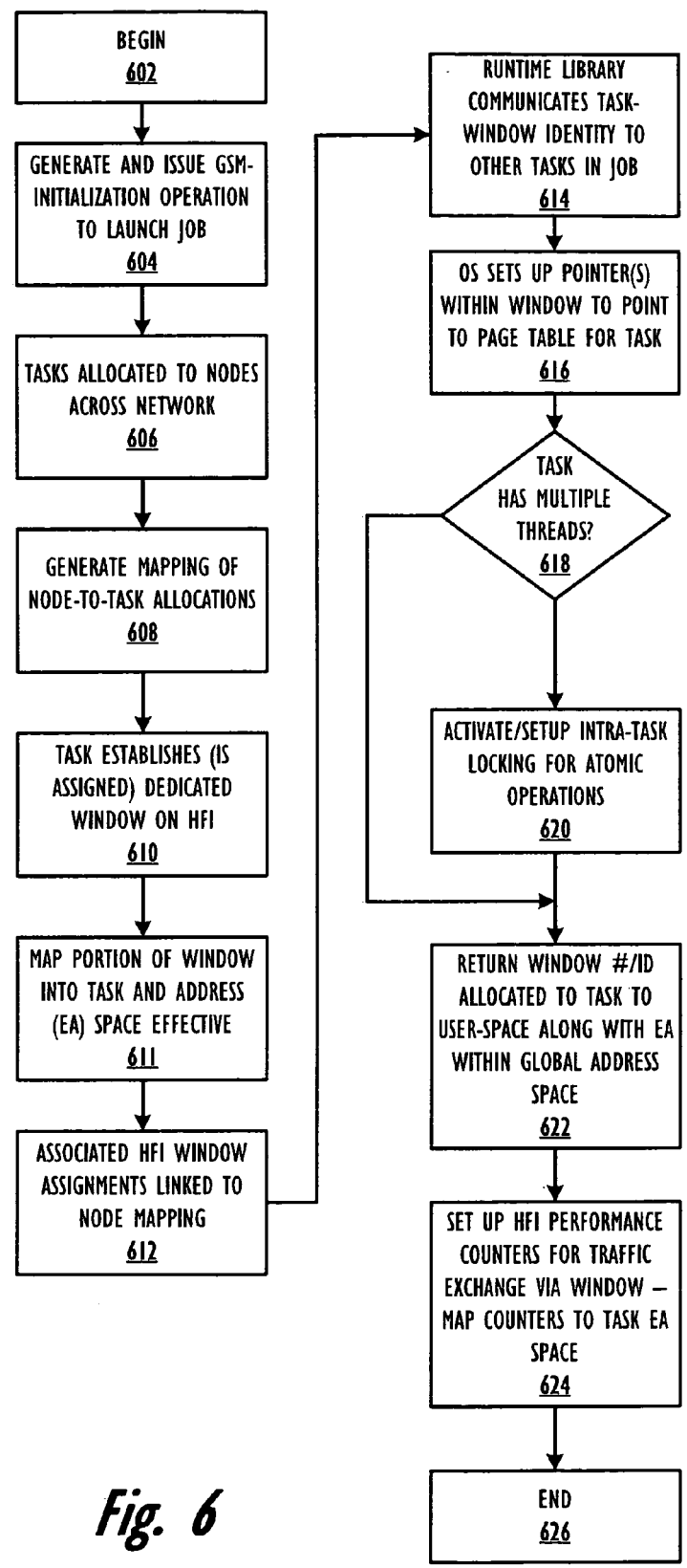
FIG. 6 is a flow chart of the method of initiating/establishing a job within the GSM environment, including allocating tasks to specific nodes and assigning windows within the HFI, in accordance with one embodiment of the invention.

The method for generating and distributing the tasks of a job (e.g., Job 1, illustrated in FIG. 2), are described in FIG. 6. The executable of the program is supplied to the job management program 206, with user-supplied execution attributes in a job command file. These attributes include the number of nodes on which the job needs to execute. The job management program 206 generates a job ID (that is unique system-wide) and selects a set of nodes in the system on which to execute the parallel job. The job management program 206 then invokes the runtime system 208 for parallel jobs (e.g., (POE)). The runtime system 208 in turn spawns the user executable on the set of nodes that the job management program 206 allocated for the parallel job, and the runtime system 208 sets up state that permits each task to determine the task's unique rank ordering within the parallel job. For example, in a job with N tasks, exactly one task will have the rank order i, where 0<=i<N. The runtime system 208 also provides the mapping (in the form of a table) between the tasks and the physical nodes on which the tasks are executing. Setup operations performed by the job management program 206 also permit the tasks to access interconnect resources on each cluster node.

Figure 3A:
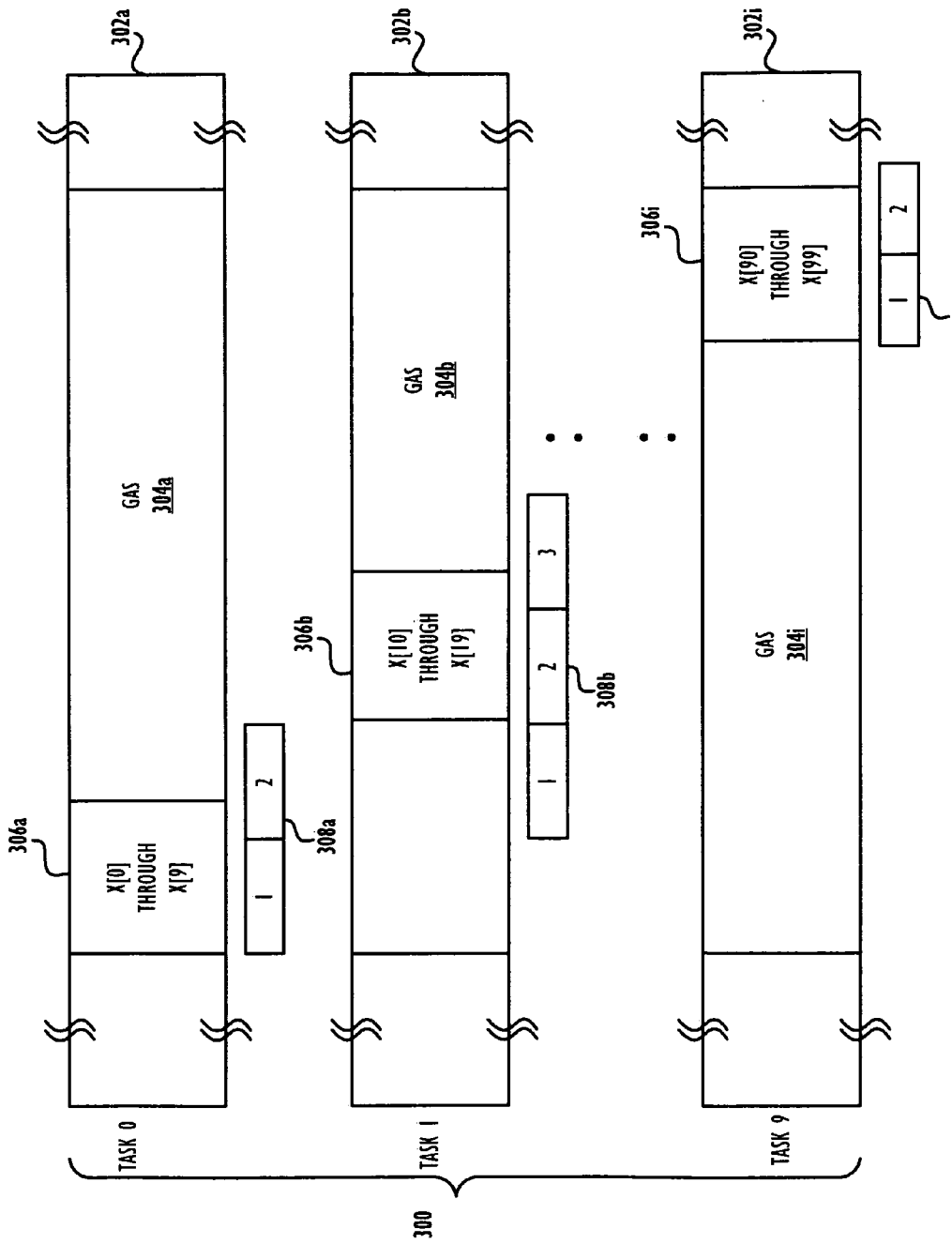
FIGS. 3A and 3B illustrates two example allocations of global address space (GAS) among multiple tasks of a job to enable GSM operations, according to alternate embodiments of the invention.
Figure 3B:
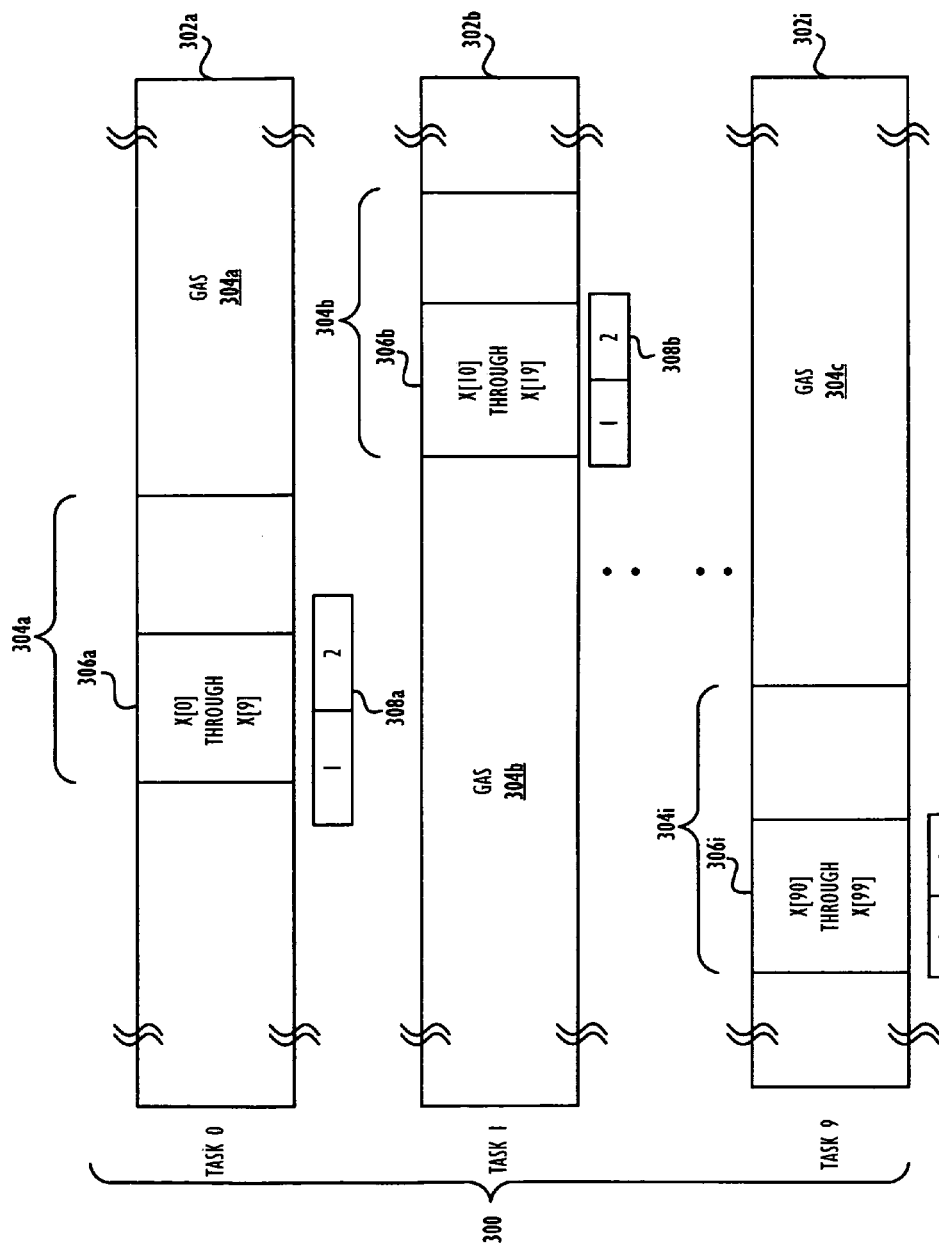

In order to complete the processing by the HFI and other functional features of the invention, a system-level establishment (or system allocation) of the global shared memory is required. FIGS. 3A-3B illustrate two embodiments of assigning tasks to address spaces within the global address space during setup/establishment of the GSM environment. The complete description of this process is presented within co-pending patent application Ser. Nos. 11/958,668 and/or 11/958,956. Relevant content of those applications are incorporated herein by reference.

During initialization of the tasks of a parallel job, each task issues a system call to set up the global address space. In addition to reserving effective address space, the system call also accomplishes two additional tasks. First, the call initializes a HFI window hardware structure in preparation for usage in the global shared memory model. Second, the system call creates a send FIFO and a receive FIFO, which allow the task to send active messages to one another via the node's HFI.

Once the global address space has been initialized, individual tasks can allocate physical memory that can be globally addressed by all tasks of the job. Memory allocation on each task is achieved through a second system call, which specifies the amount of memory to be allocated, as well as the effective address within the already-reserved global address space (GAS) where the allocated memory must appear. All allocations are done locally with respect to the task issuing the second system call. Once allocation is completed, all threads within the locally-executed task can access the allocated memory using load and store instructions.

In order to use the GSM feature, each of the group of tasks for the job has to communicate the results of the first system call and co-ordinate amongst each other the arguments to the second system call invocation. FIG. 6, described below, illustrates the method by which these inter-task coordination of system calls are completed.

Referring now to FIG. 3A, there is depicted a representation of an exemplary effective address space of tasks of a parallel job following the establishment of the GAS. In the exemplary embodiment, parallel job 300 comprising ten tasks, labeled Task 0 though Task 9. Each of the ten tasks is allocated a respective one of effective address (EA) spaces 302A-302i by its operating system 204. These effective address spaces are allocated to each task independent of the existence of the other tasks. After each task issues an initialization system call, a portion of the effective address (EA) space on that task is reserved for use exclusively for performing global shared memory (GSM) allocations, as illustrated at reference numerals 304A-304i.

With reference now to FIG. 3B, there is illustrated a representation of an exemplary effective address space of tasks comprising a parallel job following the allocation of memory in the GAS 304A-304i. In the depicted example, the allocation for a shared array X[ ] distributed across the GAS 304A-304i is shown. In particular, region 306A is allocated to X[0]-X[9] in GAS 304A of Task 0, region 306B is allocated to X[10]-X[19] in GAS 304B of Task 1, and so on until finally X[90]-X[99] is allocated in region 306i of GAS 304i. The portions of X[ ] allocated to the GAS 304 of a task are homed on the node executing that task. Physical memory 308A-308i is further allocated on each task's node to back the portion of X[ ] homed on that node.

FIGS. 3A and 3B provide two alternative methods though which the array x[ ] can be allocated. For instance, as shown in FIG. 3A, array x[ ] can be allocated such that the array can be accessed with contiguous effective addresses within the global address space of all ten (10) tasks participating in the parallel job. The global address space can also be caused to begin at the same effective address on each task, through the co-ordination of arguments to the second system call invocation. FIG. 6, described later, illustrates the method by which these inter-task contiguous coordination of system calls are completed. Shared array x[] can also be allocated in a non-contiguous manner within the global address space. Finally, the global address space can start at different effective addresses within the tasks.

For the allocations in FIGS. 3A and 3B, the operating system of the node on which each task executes only allocates backing memory for those portions of the task global address space that are homed on that node. Elements 308a through 308i in each figure show how the physical memory may be allocated to store the portion of the array x[]homed at that node. As shown, for tasks 0, 1, and 9, the allocation in FIG. 3A takes seven physical pages while that in FIG. 3B takes six physical pages. Every access to a shared variable in a GSM application must be translated into a tuple of the form <T, EA>, where EA is the effective address on task T where the location is homed.

Practicality in data structure placement is a very important consideration since practicality can have a huge impact on the amount of physical memory required to support the allocation. For instance, if the programmer specifies that the shared array x should be distributed in a cyclic manner, an extensive amount of fragmentation and wasted physical memory will result if the array were to be allocated such that the array can be contiguously addressed within the global address space. For such an allocation, savings in the amount of physical memory required to back up the homed portions of x[] would be achieved by compacting the data structure. The GSM feature described herein thus provides applications with considerable flexibility in deciding how to map global data structures. As FIGS. 3A 3B show, simplicity in determining where a shared element is homed can be traded off against the fragmentation costs of the chosen mapping scheme.

Using the above allocation of GAS to tasks of a job, the embodiments of the invention enables a job to be scaled across a large number of nodes and permits applications to globally share as large a portion of the application's effective address space as permitted by the operating system on each node. Also, no restrictions are imposed on where the tasks of a job must execute, and tasks belonging to multiple jobs are allowed to execute concurrently on the same node.

B. HFI, HFI Window, Send and Receive FIFO, MMU and Memory Mapping

Figure 4:
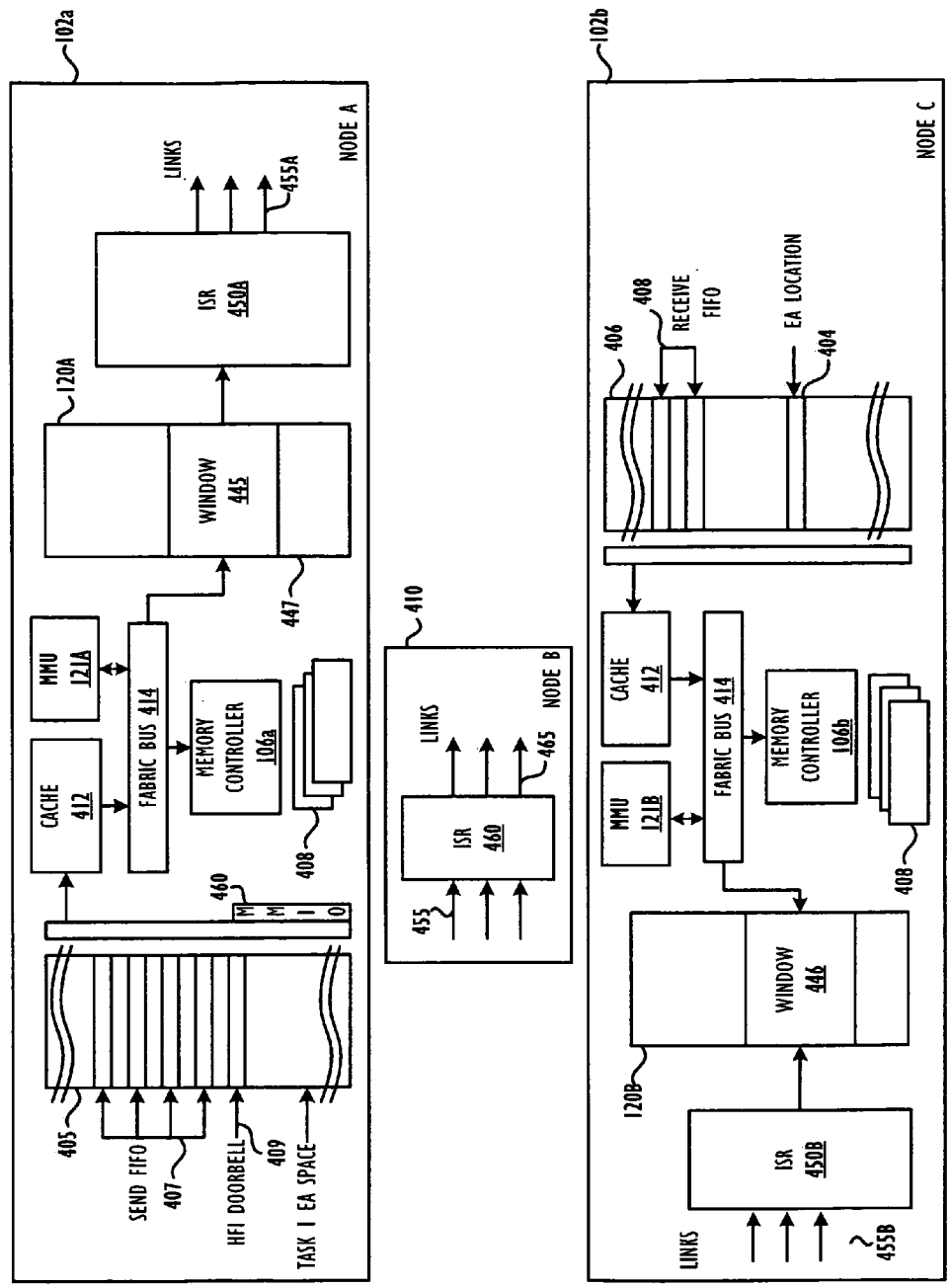
FIG. 4 is a block diagram illustrating components of an example send (initiating) node and target node utilized for processing of GSM operations, according to one embodiment of the invention.

Referring now to FIG. 4, there is illustrated another more detailed view of the data processing system 100 of FIGS. 1 and 2 with the hardware (and software) constructs required for generation, transmission, receipt and processing of GSM operations across physical nodes within the GSM environment. First computer node 102a (initiating or sending node) and second computer node 102b (target or receiving node) includes HFI 120a, 120b, respectively. HFI 120 is a hardware construct that sits on the coherent fabric within a (processor)

chip. Each HFI 120 provides one or more windows 445 (and 446) (see FIG. 5) allocated to a particular executing task of a parallel job.

When an executing task of a parallel job issues an initialization system call, the operating system (OS) of that node attempts to establish a dedicated window on the HFI for that task. If the operation succeeds, a portion of the allocated HFI window is first mapped into the task's address space. The memory mapped IO (MMIO) space 460 includes a command area and FIFO pointers. After the appropriate portion of the task's effective address space is reserved (i.e., mapped to the physical memory), the operating system sets up the window to point to the page table for that task so that effective addresses within inbound (i.e., from the interconnect 410) GSM commands can be translated.

In processing system 100, first node 102*a* represents the sending/initiating node and is illustrated with send FIFO 407 within memory 405 that is accessible via a MMIO 460. Second node 102*b* represents the receiving or target node and is illustrated with receive FIFO 408 within its memory 406. It is understood that even though an asymmetric view is shown, both processing nodes 102*a* and 102*b* are similarly configured, having both send FIFO 407 and receive FIFO 408, and each node is capable of performing both send and receive functions. Within processing system, 100, the HFI 110 is the primary hardware element that manages access to the interconnect (410). The interconnect is generally represented by links 455*a*, 455*b* routing switch 410, and a series of switch elements 450A, 450B and 460. HFI 120A thus enables a task executing on sending node (120*a*) to send GSM operations (with a destination or target identified by the job ID, node ID and window ID) to a receiving/target node 102*b*.

As further illustrated in FIG. 4, processing nodes 102 include at least one memory controller 106, which is coupled to local fabric 414 to provide an interface between HFI 120 and respective physical system memory (DIMMs) 408. Processing nodes 102 also include MMU 121, which is coupled to fabric bus 414. MMU 121 may be a part of (i.e., integrated into) HFI 120 and provides the EA-to-RA translation required for GSM operation processing by the HFI 120. Coupled to fabric bus 414 is processor cache 412, which is in turn connected to processing units of the central processor. Also illustrated is (form the perspective of the executing task), a view of the mapping of EAs to physical memory space 405 allocated to the executing task. Within this virtual view of the physical memory is a send FIFO 407 which is used to store commands and data generated by the task, prior to being processed by HFI 120 to generate GSM operations within send FIFO, and is utilized to alert the HFI 120 when to retrieve operations from the send FIFO 407. Similarly, receive FIFO 408 of target node 102*b* is located within physical memory 406, in which an EA mapping location 404 is also identified for reference.

The HFI window 445 and 446 provide a task-level view into the node's hardware that enables GSM commands to be launched with regards to a particular task's effective address space (302) and for the effective addresses (EA) contained within commands to be appropriately translated. HFI windows 445 are basic system constructs used for GSM operations. Each HFI 120 may contain multiple windows 445, and each window is allocated to a single task of the one or more tasks executing on the computer node 102.

Figure 5:
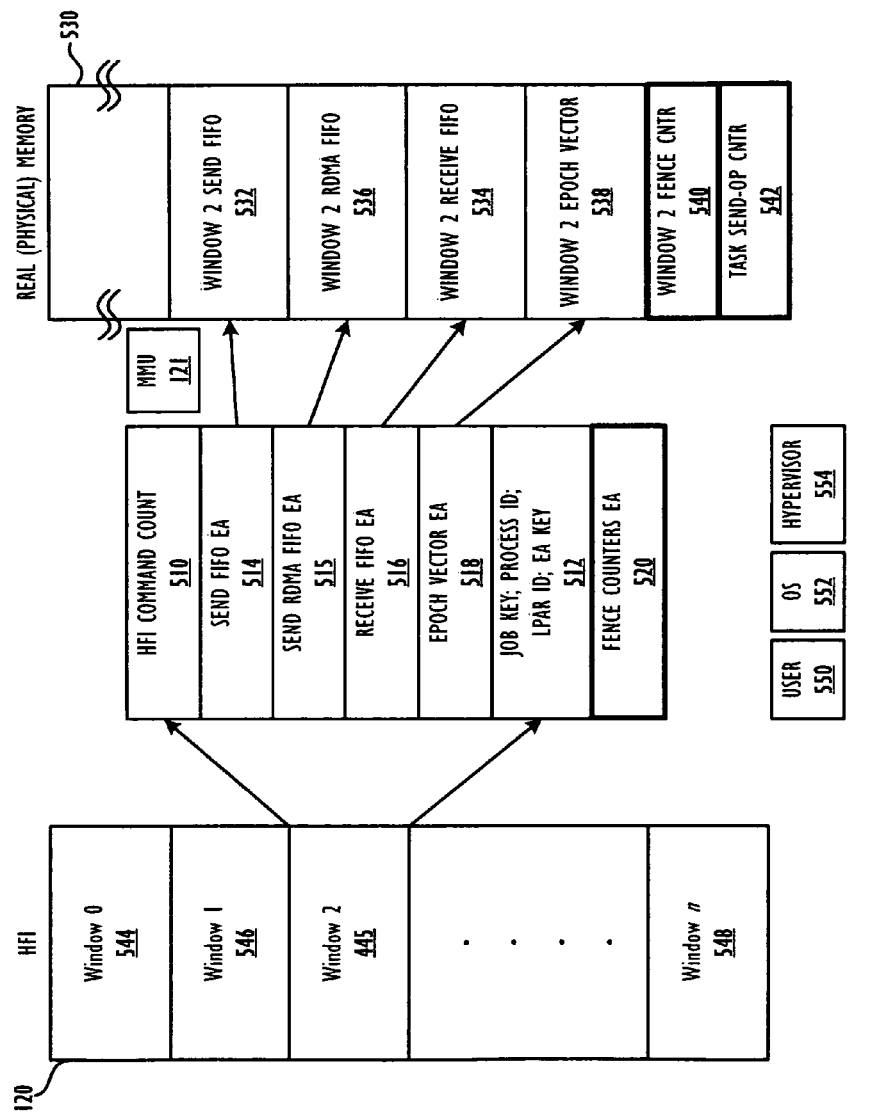
FIG. 5 illustrates a detailed view of an example HFI window and the association of window entries to specific memory locations within the real (i.e., physical) memory, in accordance with one embodiment of the invention.

Further functional characteristics of example HFI windows 445 are illustrated by FIG. 5, which is now described. As shown by FIG. 5, HFI 120 consists of a plurality of windows (window0 through windowN) of which HFI window2 445 is selected as the example window. Each HFI has a fixed number of windows, each of which can belong to exactly one task, although more than one window may be assigned to a task. The window assigned to a task is used by the HFI 120 to both launch GSM messages originating from the task as well as handle incoming messages accessing that task's effective address space. HFI window 445 is accessible by task-generated commands, which may be generated at different functional levels, including by a user 550, an OS 552, and/or a hypervisor 554.

HFI window 445 consists of a plurality of functional entries, such as command entries, credentials entry, an address translation entry, and data structures used by the HFI to control message transmission and reception. Specifically, as illustrated, window2 445 comprises the following entries, without limitation, HFI command count 510, send FIFO EA 514, SEND RDMA FIFO EA 515, receive FIFO EA 516, epoch vector EA 518, credentials 512, and fence counters 520. In the illustrative embodiment, credentials 512 includes the job ID (also referred to herein as a job key), process ID, LPAR (logical partition) ID and EA key. The HFI references the credentials 512 to correctly authenticate an incoming GSM transaction as being authorized to performing an operation on the associated task's effective address space. It is appreciated that the different components of credentials 512 may also be represented with its own entry within HFI window 445. Each of the above entries are registers providing a value of a memory location at which the named entry is stored or at which the named entry begins (i.e., a start location) within the effective address space of the task. These effective addresses are translated by MMU 121 into corresponding real addresses that are homed within the physical memory 530. HFI forwards one of the effective addresses of Window contents to MMU 121, and MMU 121 translates the effective address into a real address corresponding to the physical memory 530 to which the EAs of the task identified by the credentials are mapped.

HFI window 445 also comprises one or more fence counters 520 for tracking completion of GSM operations during a local fence operation and a global fence operation. The fence counters 520 referenced by the EAs in map to fence counter 540 within the real memory location assigned to the task. In order to assist with local (task-issued) fence operations, the RA space assigned to the task also includes a send-op counter 542 to track the completion of task-issued commands, which are initially stored in send FIFO 532, before passing to HFI window for processing.

Thus, as further illustrated, send FIFO EA 514 holds the start effective address for the task's send FIFO, which address can be translated by MMU 121 to point to the start (real address) of send FIFO 532 in physical memory 530. Likewise, receive FIFO EA 516 holds the start EA of the task's receive FIFO 534, which address is translated by MMU 121, and points to the start address in physical memory 530 of the receive FIFO 534 of the task. The SEND RDMA FIFO EA 515 and epoch vector EA 518 similarly can be translated by MMU 121 to point to the start real addresses of the SEND RDMA FIFO 536 and Epoch vector 538, respectively. Note that while the send FIFO 514 and receive FIFO 516 may be contiguous in the effective address space of the task to which that window corresponds, these FIFOs (514, 516) may be discontiguous in real (physical) memory 530.

Each HFI window contains key resources including the pointer to the address translation tables that are used to resolve the effective address (with respect to a particular task) into a real address. The window number within the HFI that is allocated for the GSM initialization operation is returned back to the user as an opaque handle, which may contain an encoding (embedding) of the node and window number, along with the effective address where the global address space is reserved within that task's effective address space. The language run-time takes on the responsibility for communicating each task's window identity to all other tasks that wish to issue GSM commands to that task. If a task has multiple threads of control, atomicity to the HFI window has to be ensured either through normal intra-task locking primitives, or by assigning each thread its own distinct HFI window. Finally, HFI performance counters for all traffic based on that window are also mapped into the task's address space. This permits the task to easily monitor statistics on the interconnect traffic.

HFI windows may be shared amongst one or more logical partitions. If a single node is partitioned, the operating system running on a partition may only have access to a subset of the total number of supported windows. The OS may further reserve a subset of these windows for kernel subsystems such as the IP device driver. The remaining windows may be available for use by the tasks executing within that partition.

When a window is allocated on the HFI, the operating system tags the window with the identity of the job to which the task belongs. During issuance of GSM operations, all outgoing packets are automatically tagged by the HFI with the job id. Outgoing packets also specify a particular window on the destination/target node's HFI 120B in whose context the GSM effective address must be translated. The HFI compares the job ID contained within the GSM packet against the job id contained within the window. If the job ID's do not match, the packet is silently discarded. Statistics that count such packets can be used to gently dissuade system users from either unintentionally or maliciously flooding the system with such packets.

Thus, unauthorized access to a task's effective address space is not permitted during the course of global shared memory operations. A task is able to send a GSM operation to any task belonging to any job running anywhere in the entire system. However, the HFI will perform the GSM operations on the targeted task's effective address space if and only if an incoming GSM command belongs to the same job as the task whose address space the command manipulates. A further granulation of job IDs is also possible, whereby a task can give specific authorization to only a subset of the tasks executing within the job. This can be done by a subset of the tasks requesting a different job ID to be associated to them, causing that job ID to be installed into the HFI window associated with these tasks.

In order to fully appreciate the functionality of each of the above listed entries and the entries use during GSM operation to retrieve values from within physical memory 430, a description of the process of assigning a window to support a task of a parallel job is now provided. This process is illustrated by FIG. 6, which is now described. Generally, FIG. 6 is a flow chart of the method of initiating a job within the GSM environment and allocating the various tasks of the job to specific nodes and assigning a window within the HFI of those nodes to a task, according to one embodiment of the invention.

The process begins at block 602, and proceeds to block 604, at which an application generates and issues a GSM initialization operation to launch a parallel job. Initialization of the job leads to allocation of a plurality of tasks to certain nodes across the distributed network, as shown at block 606. At block 608, mapping of these nodes with allocated tasks is generated and maintained at each node. At each local node with one of these tasks, before using global shared memory, the task establishes (or is assigned) a dedicated window on the HFI for that task, as provided at block 610. A portion of the allocated HFI window (including a command area and FIFO pointers—FIG. 5) is first mapped into the tasks effective address (EA) space as shown at block 611. The mapping of EA-to-RA for the task is provided to the MMU 121, for later use by the HFI during GSM processing. Additionally, the unique job key or job ID is embedded into the HFI window assigned to the task.

At block 612, the HFI window assignments for the various tasks are linked to a generated node mapping for the job, and then at block 614, the runtime library communicates task-window identity to other tasks in the job. This enables each task to be aware of the location of the other tasks and permits subsequent software operations that allocate memory to determine on which node a certain variable allocated in the global address space should be homed. After the appropriate portion of the task's effective address space is reserved, the operating system sets up the HFI window pointer(s) (page table pointer 5202) to point to the page table for that task so that effective addresses within inbound (i.e., from the interconnect) GSM commands can be translated at the node, as indicated at block 616. Send and receive pointers (514, 516) are also established within the HFI window 445 that are translated to specific physical memory locations by MMU 121.

At decision block 618, the OS determines if the task has multiple threads. When a task has multiple threads of control, the OS ensures atomicity to the HFI window through normal intra-task locking primitives, as shown by block 620. Alternatively, a task may request a separate window for each of its threads. At block 622, the window number within the HFI 110 that is allocated during the GSM initialization operation is returned back to the user space (task) 550 as an opaque handle, along with the effective address where the global address space is reserved within that task's effective address space. Finally, at block 624, HFI performance counters for all traffic based on that window are also mapped into the tasks effective address space. This setup of performance counters permits the task to easily monitor statistics on the interconnect traffic. The process then ends at termination block 626.

C. GSM Operations

After a global address space is established and memory allocated as generally described above (FIG. 6), each task is able to perform the following basic operations: (1) Reads or "gets" to memory; (2) Writes or "puts" to memory; and (3) Restricted atomic operations such as those belonging to the set {ADD, AND,OR,XOR, COMPARE_ AND_SWAP, FETCH_AND_OP}. Ultimately, all GSM operations are relayed by interconnect messages to (and from) the nodes where a memory location is homed. The basic GSM operations listed above therefore need to be converted into interconnect messages that are processed at the appropriate home node. Furthermore, any response messages also need to also be processed at the sending node (i.e., the node receiving a response from a target node for a previously sent GSM operation). The HFI, and specifically the HFI window allocated to the particular task, is utilized to provide the hardware support for these and other GSM-related functions. GSM commands are transmitted by a task to the HFI by simply writing to the memory mapped address space.

The below described embodiments enables different tasks in a (parallel) job to perform operations efficiently on the global address space of the parallel job by using a HFI to issue GSM operations across the fabric of the GSM environment. Among the operations that are performed are reads, writes, certain types of atomic operations, and higher level operations that can be constructed using one or more of these basic operations. Within GSM task execution, all operations refer to effective addresses within the constituent tasks of the GSM job. GSM operations are non-coherent, can be issued by an application from user-space code, and have a simple API (application programming interface) that they can be sued by the compiler, library, or end-user.

In one embodiment, GSM task execution does not provide/support load-store access to a location within the global address space that is homed on a remote node. That is, when a particular global address space location is homed on example target node, a task executing on a different node is not able to access the location using a load or store instruction. Rather, with GSM task execution, a GSM operation (such as a read, write or atomic operation) must be employed in order to access the location. However, the executing task utilizes load and store instructions from the PowerPC® ISA (instruction set architecture) to access GSM locations that are homed on the node where the task is executing.

Figure 7:
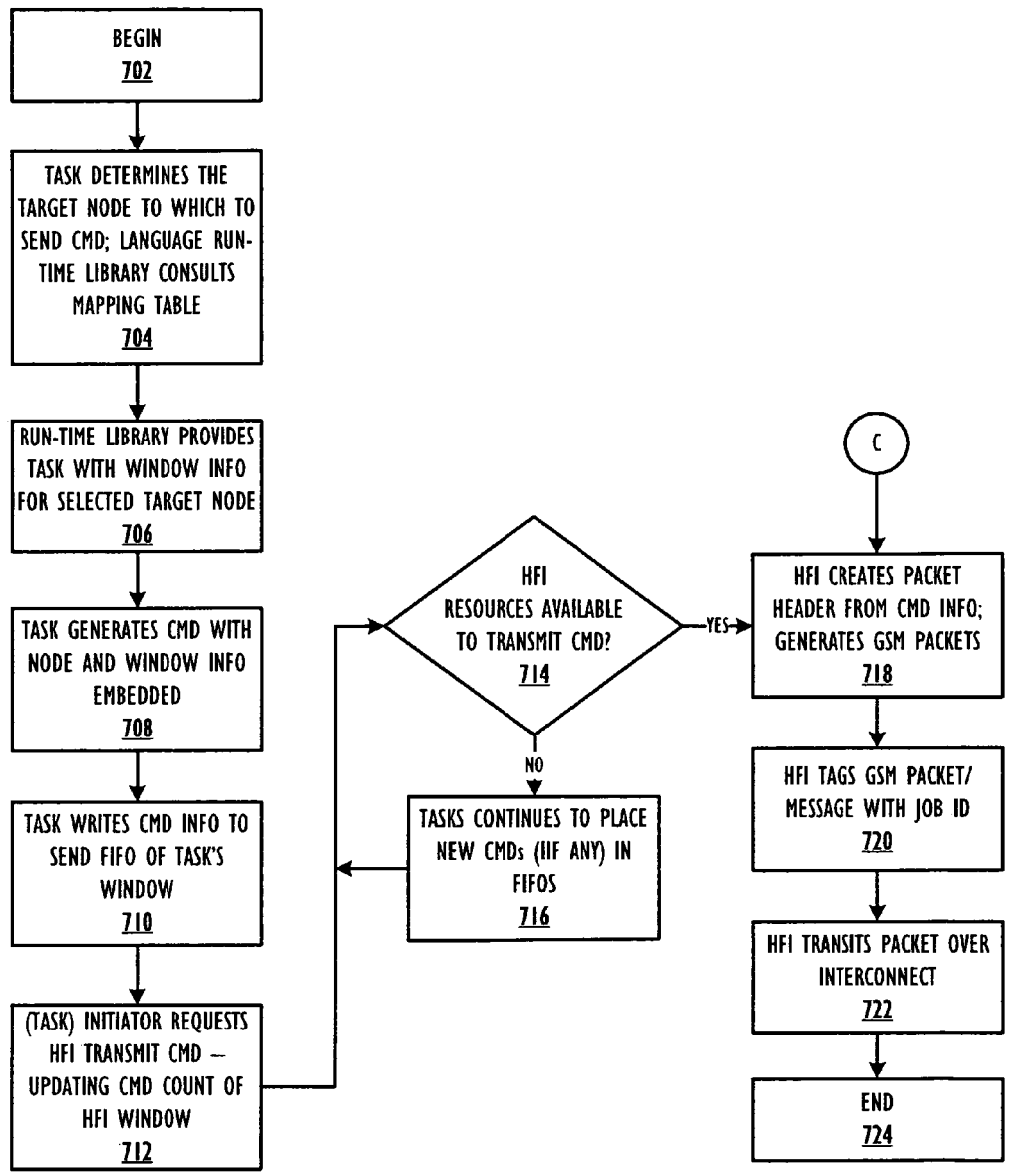
FIG. 7 is a flow chart illustrating the method by which the HFI processes a command generated by a task executing on the local node, in accordance with one embodiment of the invention.
Figure 8:
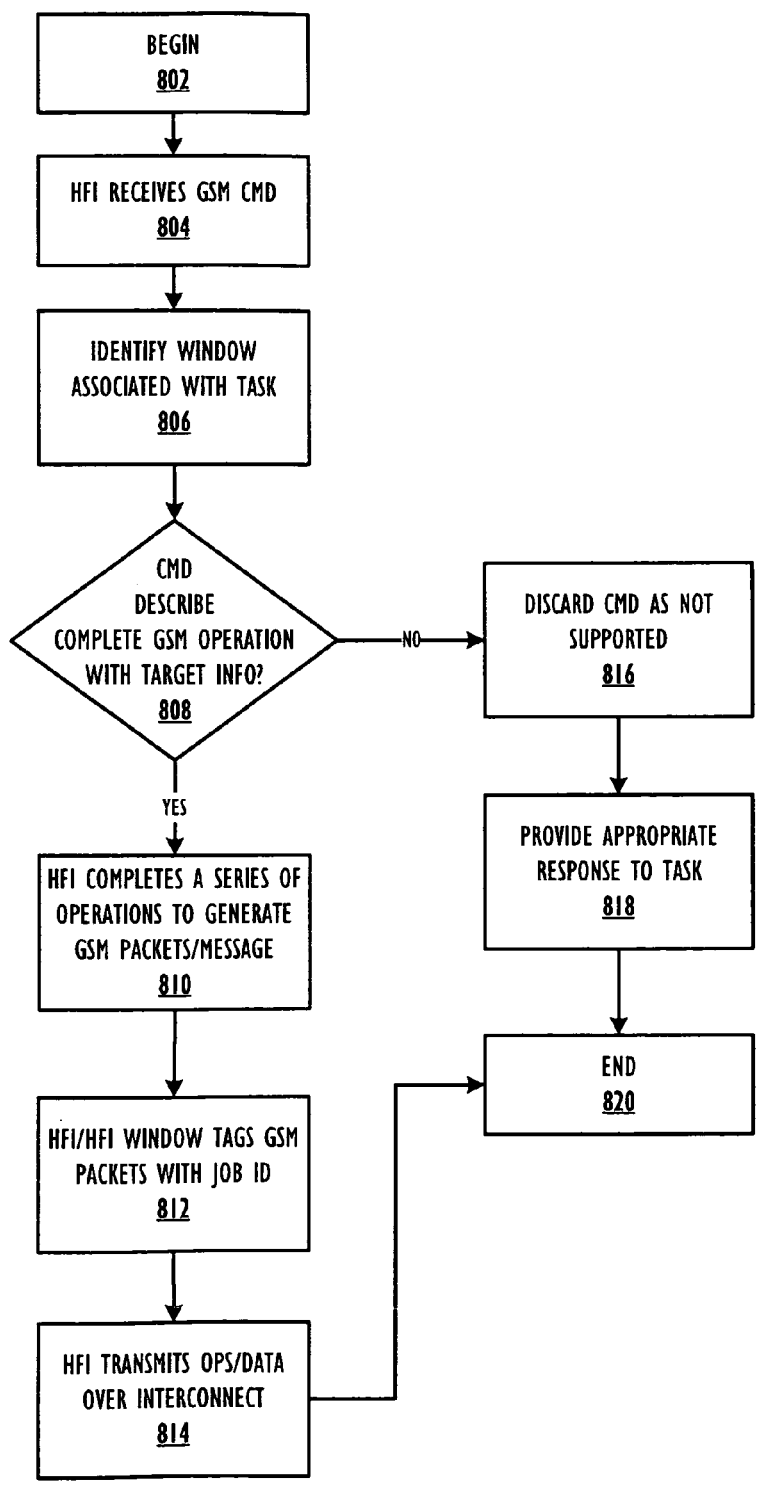
FIG. 8 is a flow chart illustrating the method by which the HFI generates and transmits a GSM packet, in accordance with one embodiment of the invention.
Figure 9:
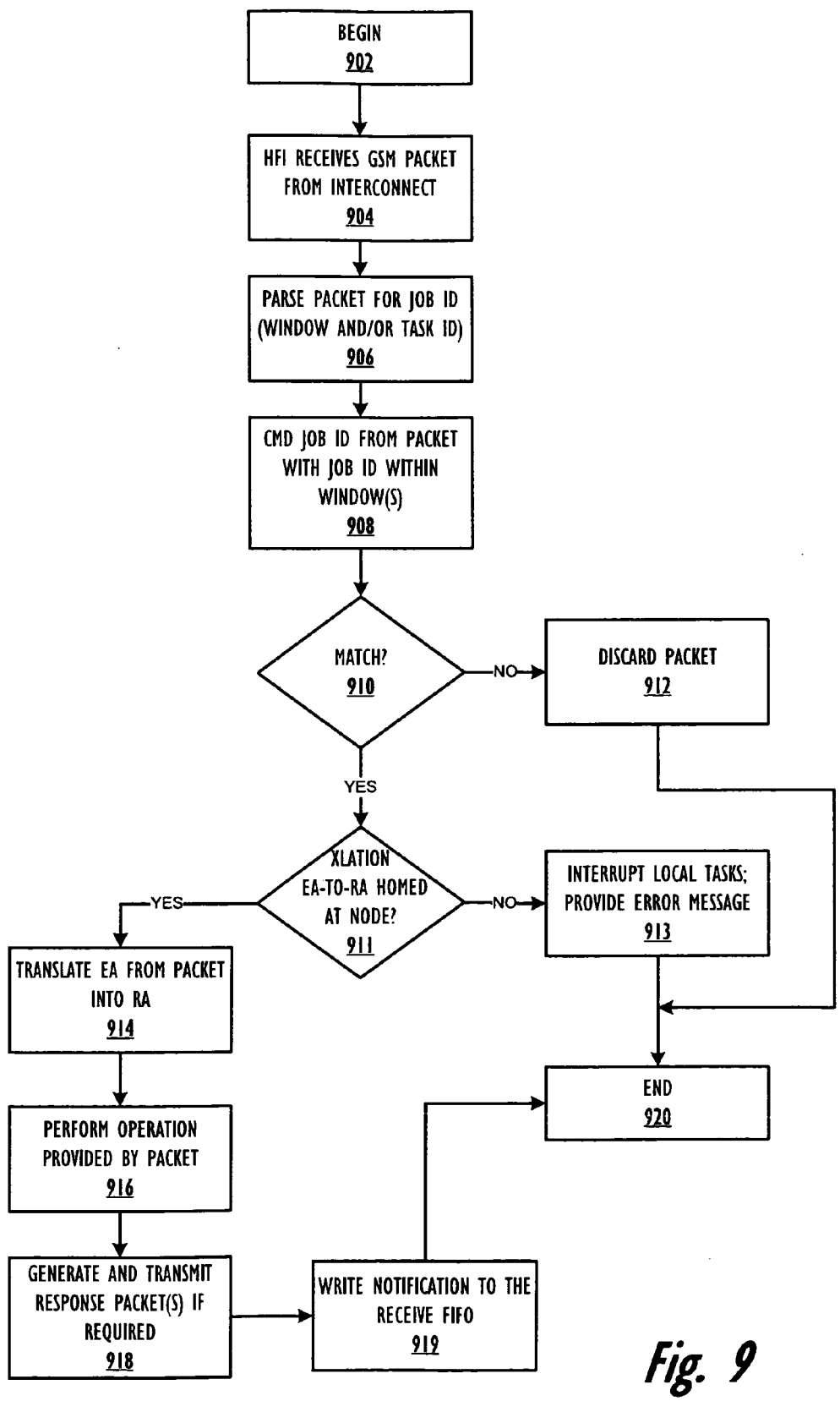
FIG. 9 is a flow chart of the method by which incoming GSM packets are processed by the HFI and the HFI window of a target/receiving node, according to one embodiment of the invention.

Turning now to FIGS. 7-9, which provide flow charts illustrating the methods by which the HFI and the HFI window are utilized to enable GSM operations across different physical nodes of a processing system. Although the methods illustrated in FIGS. 7-9 may be described with reference to components shown in FIGS. 1-5, it should be understood that this is merely for convenience and alternative components and/or configurations thereof can be employed when implementing the various methods. Key portions of the methods may be completed by the task executing within data processing system (DPS) 100 (FIGS. 1, 4) and controlling access to a GSM location of/on a target node, and the methods are thus described from the perspective of either/both the executing task and/or the HFI and HFI window. For example, referring to FIG. 4, a GSM operation is initiated by a task on node A 102a to a location that is homed in the effective address space of a task on node C 102b.

GSM commands issued by a task are in the form of operations on locations within another task's effective address space. Consequently, the effective address embedded in a GSM command is meaningless without knowing the specific task with reference to which the effective address must be translated into a real address. The HFI evaluates received GSM commands from a local send FIFO before generating the corresponding GSM message (packets). HFI and HFI window functionality provides the ability to launch GSM commands (i.e., interconnect messages) through user-space commands.

In the following description, the terms GSM packets, GSM messages, GSM operations, and GSM data are interchangeably utilized to refer to any component that is transmitted from a first HFI window of an initiating task to a network fabric and/or is received from the network fabric at a second HFI window of a target task. GSM command refers simply to any task-issued command that is intended to be processed by the HFI and issued to the network fabric. The task also provides non-GSM or standard commands that are executed on the local processing node.

FIG. 7 illustrates the method by which the HFI generates GSM packets from task-issued commands placed in a send FIFO (first-in first-out) buffer, in accordance with one embodiment of the invention. The process of FIG. 7 begins at block 702, and proceeds to block 704 at which the task determines a target node in the system to which an EA is homed within the GSM. Before a task is able to issue a GSM command, the task needs to have or obtain knowledge of the destination node and the destination node window for directing/addressing the local command. In one embodiment, the run-time library ascertains the physical node on which the task is executing by looking up the mapping table that is generated by the POE when the job is first launched. The runtime library provides the task with window information for the selected target node, as shown at block 706. At block 708, the task generates a command with the destination node and window information included in the command. It should be noted that the POE mapping is provide for convenience only. The present invention allows the task identifier to encode the node/window combination.

Referring to FIG. 4, as part of the command structure, the task on node A 102a creates the GSM command. The command structure includes the identifier (ID) of the destination/target node and the window on the destination node against which the message must be examined. Specifying the window on the destination node versus specifying the task (executing on the destination node) simplifies the hardware implementation. For put operations that involve long memory transfers, the task also includes the start effective address and range information as part of the command.

Returning to the flow chart, as provided at block 710, the task writes the command describing the operation into the send FIFO. These commands accumulate in initiating task's cache (FIFO) as the commands are created. At block 712, the task's initiator triggers/requests the HFI transmit the stored commands by updating the command count location/register, which is physically resident on the HFI window. As previously described, the command count location is memory mapped into the tasks address space of physical memory. This action constitutes "ringing" the HFI doorbell.

Referring again to FIG. 4, as the task creates GSM commands, the task keeps updating the number of operations that need to be handled by the HFI. Commands are created in the send FIFO 407 (FIG. 4), which is backed by local physical memory 408, and can be resident in the cache 405. The send FIFO resides in physical memory but is mapped into the task's address space and is cacheable by the task. After assembling one or more commands, the task writes the number of assembled commands to the HFI window door bell location 409. In one embodiment, the door bell location 409 is physically resident on the HFI 120, but is memory-mapped into the task's effective address space. The commands at the doorbell location 409 are retrieved by the HFI and utilized by the HFI to generate a GSM packet (containing GSM operations, data or messages) that the HFI transmits to a target task via the network fabric.

In order to transmit a GSM operation, the HFI needs certain buffer resources. As these buffer resources become available, the HFI retrieves commands from the send FIFO. Thus, at decision block 714, HFI logic determines if HFI resources are available to transmit the command using the task-assigned window. When HFI resources are not currently available, the task may continue to place new commands (if any) in the send FIFO, as shown at block 716. However, if there are HFI resources available, the HFI creates packet headers from the command information and generates the GSM packets, as shown at block 718. For long put operations, the HFI also translates the start address and fetches (DMAs) data from the local node. The retrieved data is used to create a GSM message. HFI data structures in the window assigned to the task are also referenced/updated. The HFI window tags the job ID of the task to the GSM message, as shown at block 720. The job ID is maintained in the send window and is included as part of every GSM message issued by the HFI window. At block 722, the HFI routes the message (as GSM packets) through the interconnect switch. Then, the process of generating the GSM packets using the HFI ends at termination block 724.

FIG. 8 is a flow chart illustrating the method by which the HFI processes a received command from a task executing on the local node, according to one embodiment. The process begins at block 802 and proceeds to block 804 at which the HFI reads/receives the command(s) from the send FIFO when the HFI has the buffering resources necessary to transmit packets on the interconnect. The HFI also receives a count of the number of operations that need to be transmitted, so that the processor (104, FIG. 1) is decoupled from having to wait while the HFI may be busy transmitting prior commands. Each command either fully describes a GSM operation, or contains start and range information for long "put" (i.e., write data to target) operations. In order to facilitate GSM operations that operate on small amounts of data, a command can also contain immediate data, provided the combined command and data fit within a cache line of, for example, 128 bytes. If a put command is larger than some fixed size, the request is put onto the RDMA command send FIFO 515. This allows small data movement requests to be handled with higher priority than large data movement requests and prevents large transfers from blocking small transfers.

The HFI identifies the window associated with the task generating the commands placed in the task's send FIFO, as shown at block 806. The HFI logic then determines, at block 808, if the command is a legal GSM command. A legal GSM command includes the required target node and window identifiers, and an operation that is supported via GSM processing (e.g., a get, put, or atomic operation), and any other parameter(s) for generating a GSM packet. When the command is not a legal GSM command, the HFI window discards the command as not supported by GSM, as provided at block 816, and the HFI window provides an appropriate response/notification to the executing task, at block 818.

However, when the command is legal, the HFI completes a series of operations to generate the GSM packets from the command, as indicated at block 810. Among these operations performed by the HFI are one or more of (a) creating a packet header from the command information, (b) potentially fetching (via DMAs) data from the local node, and (c) generating the packets. The HFI window then tags the packet with the job ID at block 812, and the HFI window transmits the packets over the interconnect, at block 814. The process ends at termination block 820. In a system where the individual nodes execute operating systems that do not trust one another, the installed job ID (206) can also be encrypted or hashed to make it tamperproof.

In order to appreciate the generation and issuing of a GSM message (i.e., a GSM operation transmitted via multiple GSM packets) with sequence number and count tuples, an example GSM command and corresponding example GSM packet are illustrated by FIG. 10. The GSM command 1000 includes, without limitation, the following entries, shown without regard to actual order: an operation type, which defines whether the operation is an atomic operation or a GET or PUT operation, for example; the source effective address, $EA_S$, of the operation, which is mapped to the memory of the initiating/local task; the target effective address, $EA_T$, which is mapped to a real address in the local memory of the target task; the number of memory locations affected by the GSM operation; immediate data or the EA of the locally stored data; and flags indicating whether and/or what type of notification the receipt/completion of the operation requires. As shown, other entries may also be included within the command, and these entries are utilized to create corresponding entries within the GSM operation generated by the HFI.

FIG. 10 also illustrates an example GSM packet (of multiple packets) generated by the HFI in response to receiving a GSM command (for a message that cannot be transmitted by a single GSM packet). As shown, in addition to the above entries, GSM packet 1020 includes the HFI command (e.g., a remote addition operation), header information, including, without limitation and in no particular order: Job ID, which is the identification of the globally distributed job (or application), which ID is provided to each GSM packet originating from a tasks of the job; epoch entry, which is set to an actual epoch value for particular types of operations, when a guaranteed-once notification is assigned as the reliability mode. (A default value indicates a type of operation requiring a guaranteed-once delivery as the reliability mode; local and remote HFI window and node identifying task and window parameters to identify to which HFI window (or corresponding task) and at which node a GSMn HFI packet should be directed; and an index for a <sequence, count> n-tuple entry for tracking multiple GSM packets of a single GSM message/operation; and a count total of the number of expected packets.

D. Target/Receiving/Destination Node HFI Processing

When the message reaches the destination, hardware support provided by PERCS retrieves the data and sends the response back as a message. The response message is also handled by the HFI of the initiating node, causing the retrieved data to be written to the memory location of the initiating task. On the receive side of a GSM operation, the job ID in the packet is compared with the job ID in the target window. If the IDs match, the GSM command specified in the message is carried out.

For get operations, the effective address is translated on the target HFI through the use of MMU 121. Data is fetched from the memory location of the translated real address, and the data is embedded into a composed message and sent back to the initiating task (node). For put operations, the appended data is written to the physical address obtained by translating the specified effective address where the data is to be written at the target node. In one implementation, GSM atomic operations are carried out by the memory controller on board the processor chip, such as a Power7™ chip. The processor's internal bus is designed to support special transaction types for the atomic operations that are initiated by the HFI.

FIG. 9 illustrates the method by which the HFI processes received/incoming GSM messages (packets) from an initiating node, according to one embodiment. The incoming packets are processed by the HFI using the job ID and EA-to-RA matching table of the target node. The process begins at block 902 and proceeds to block 904 at which the HFI receives a GSM packet from the interconnect (through the local switch connection). The HFI parses the GSM packet for the job ID, at block 906. At block 908, HFI examines the job ID included in the message and compares the job ID with the job ID associated with the various windows supported/assigned within the HFI. A determination is made at block 910 whether the job ID matches one of the supported job IDs. If the job ID of the packet does not match any of the job IDs, the packet is discarded, as provided at block 912, and the process ends at termination block 920.

In one embodiment, the HFI may also evaluate the window and/or task ID to ensure that the packet has arrived at the correct destination node. As with the job ID, the message is discarded if the window ID information does not match that of the target window that is specified in the message. Also, in one embodiment, a threshold number of false requests may be established for each HFI window. When the number of received GSM operations that do not have the correct jobID meets of surpasses the pre-established threshold number, an error condition is registered, which triggers issuance of an administrative notification.

Returning to decision block 910, if the job IDs match, the HFI determines, at decision block 911, if a translation exists for the EA within the page table pointed to by the page table pointer (522, FIG. 5) within the HFI window. The translation is provided by MMU 121, which is accessed by the HFI to complete the check for whether the EA-to-RA translation is homed on the local node. When no valid translation exists for the EA received in the message, the local task associated with the window is interrupted, as shown at block 913. Several alternatives are possible. One alternative is to send an error response to the initiating node which could then send a non-GSM message to request a valid translation to be installed. Another alternative is for the interrupted task to install the required translation, in turn sending an error to the initiating task if the requested mapping does not exist on the target task. When a translation does exist within the page table, the HFI (via the page table) translates the effective address in the received message into the corresponding real address, as shown at block 914. The translation is performed by referencing the page table that is pointed to within the HFI window. When the address is successfully translated, the operation specified by the message is carried out/performed, as shown at block 916.

The operation is first presented on the internal fabric bus in the chip. The memory controller performs the operation on the memory DIMMs. If the locations being modified reside on any cache, the cache locations are updated in place, with the contents being injected into the cache. At block 918, the HFI window (via the task) generates and transmits a response packet, if such a response is required. The HFI also writes notifications to the receive FIFO (either writing the notification to memory or injecting the notification into the cache), as shown at block 819. These notifications are visible in the (target) task's effective address space. The (target) task can also access the locations that were modified by directly accessing the appropriate location in the (target) task's address space.

The message flows are similar for GSM atomic operations and GSM get operations. In an atomic operation, the memory controller can perform the atomic operation. Cache injection does not take place for atomic operations. For a get operation, the HFI does not perform the DMA operation and instead retrieves (DMAs) data requested by the operation. The retrieved data is assembled into a message that is then sent back to the initiating node. The HFI on the requestor performs the functions required to store the retrieved data into the initiating task's effective address space.

E. Mechanism to Provide Notification of Completion of GSM and Local Operations

When executing in a GSM environment (with multiple tasks of a single job executing at different physical nodes and having task-specific, localized EA-to-RA mapping), a local task performs two types of operations, namely, local operations and GSM operations. Local operations refer to those operations that do not require any part of the operation or data be transmitted to or received from another task that executes on a different node. Thus, where multiple tasks execute on the same node, operations of a first task involving the other locally-executing tasks are still considered as local operations. GSM operations, in contrast, require some transmission of information and/or data from/to another task that executes at a remote node (accessed via the HFI connection to the network fabric).

With the large numbers of tasks executing at the various nodes, interrelations among the processes of the various tasks often becomes important. That is, a first local task may need to notify another local task or a remote task (on a different node) of the completion of the first task's operation(s). In addition to the utilization of local and global fences (described in greater detail in related patent application Ser. No. 12/024,367 and the reliability guarantees for GSM message delivery (described in related patent application Ser. Nos. 12/024,600 and 12/024,637, the mechanism for enabling GSM processing of a job via locally assigned tasks on distributed nodes also provides a series of different notifications, which notifications are provided by the executing tasks on completion of particular types of operations.

Of the different types of notifications supported, an executing task utilizes one of two notification types to track completion of GSM operations. A first notification type enables an initiating task to signal completion of a GSM operation to the local node. A second notification type enables a target task to signal completion of a received GSM operation to the other tasks of the job, particularly the initiating task. With the latter notification type, the HFI supports the issuing of notifications to the network fabric as well as the receipt of notifications from the fabric and subsequent placing of the received notification in the local receive FIFO. Also, in one embodiment, a separate "response" FIFO is maintained in the local memory (that is allocated to the local task) for tracking notifications received by the HFI for issued GSM operations.

FIGS. 4 and 5 illustrates a receive FIFO allocated to the local task and HFI for receipt of both GSM operations and notifications. In the present embodiment, the receive FIFO provides a hardware mechanism (physical location within memory) to obtain/store notifications, including notifications of the second type, which the HFI receives from another non-local task. The HFI window allocation to the task contains the EA of the receive FIFO which maps to the RA of the receive FIFO in local memory.

In programming models such as global arrays that require arrival notification, the HFI provides the notification by writing the packet header into the receive FIFO. In one implementation, in the case of notifications, the protocol software provides a 64-bit cookie to the HFI, which the HFI inserts in the message header. Sixteen bits of this protocol header are reserved for the GSM task to utilize in any way. The other forty-eight bits in the cookie are reserved by the protocol software to manage outstanding messages. In the case of software detected failures with no recovery, the HFI utilizes some of the protocol bits as an index into an array of notifications statuses.

Figure 11:
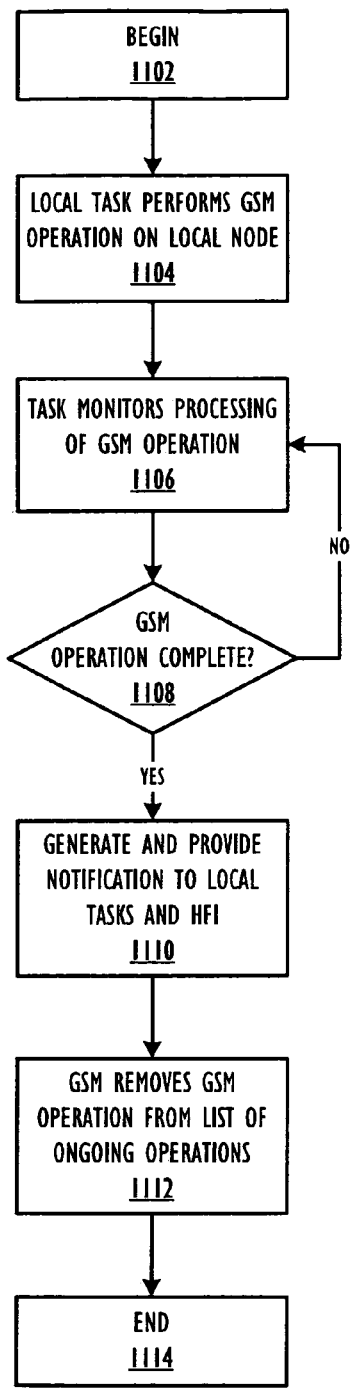
FIG. 11 is a flow chart illustrating the method by which the initiating task provides notification of completion of a GSM operation at the local node, in accordance with one embodiment of the invention.
Figure 12:
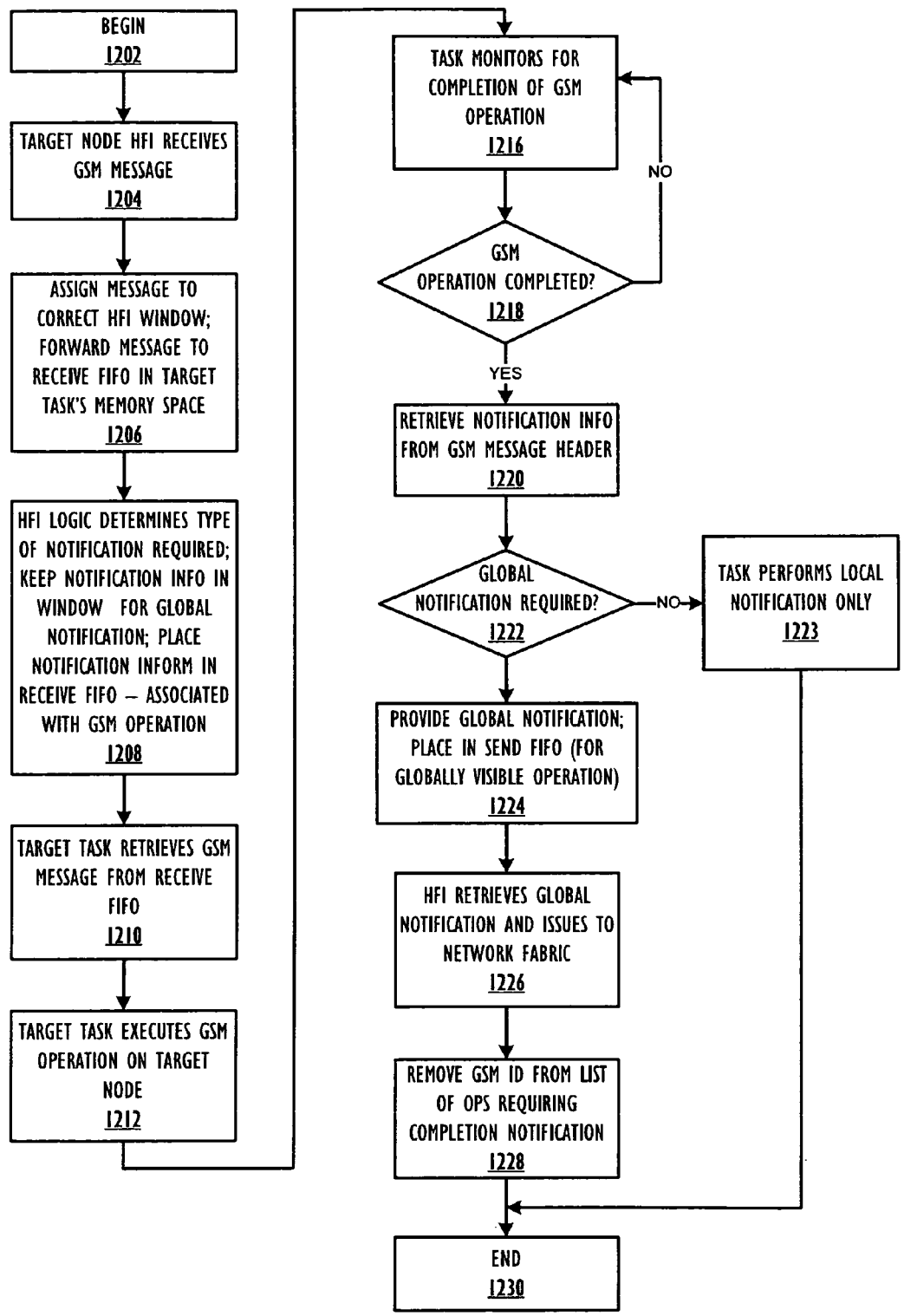
FIG. 12 is a flow chart illustrating the method by which the target task provides global notification of completion of a GSM operation at the target node, in accordance with one embodiment of the invention.

Thus, two embodiments are provided illustrating methods by which a task provides a notification when a GSM operations has been locally performed, when the GSM operation is globally visible, or both. FIG. 11 illustrates the method occurring at the local node of the initiating task, while FIG. 12 illustrates the method occurring at the remote node of the target task. The process of FIG. 11 begins at block 1102 and proceeds to block 1104 at which the local task performs an operation on the local node, which operation may be a locally-generated operation or a GSM operation received from another remote task and placed by the HFI in the receive FIFO. The local task monitors the operation, as shown at block 1106, and determines at block 1108 whether the operation completes processing. In one embodiment, the task indicates that the processing (performing) of a GSM operation has completed when local writes will not affect the GSM operation. Assuming the operation has completed processing, the task generates the notification and provides the notification to the HFI and/or other local tasks, as shown at block 1110. The GSM operation is then removed from the list of operations whose processing requires notification, as shown at block 1112, and the process ends at block 1114.

FIG. 12 then illustrates the method by which the target task generates notification of completion of a GSM operation, according to one embodiment. The process begins at block 1202 and proceeds to block 1204 at which the HFI at the target node receives a GSM message, which performs an operation within the address space of the local (target task). The HFI assigns the GSM message to the correct HFI window, and the GSM message is placed within the target task's receive FIFO, as shown at block 1206. At block 1208, the HFI logic determines the type of notification required by the GSM message and provides the notification metrics to the target task via the response FIFO (or receive FIFO along with the GSM message). This process may be completed by the target task rather than the HFI.

The target task retrieves the GSM message from the receive FIFO, as shown at block 1210. The GSM message is retrieved in the order of receipt in the receive FIFO. The target task then performs the operation required by the GSM message, as shown at block 1212. As shown at block 1214, the task monitors for completion of the GSM operation, and determines at block 1216 when the GSM operation completes processing. When the target task completes processing the GSM operations, the target task checks the type of notification required for indicating completion of the GSM message, as shown at block 1218. The task performs this determination by retrieving the notification data from the GSM message header and checking the notification metrics associated with the GSM message, which metrics may be within the send FIFO or stored within the HFI window of the task on receipt of the GSM message. Specifically, as provided by the illustrative embodiment, the task determines at block 1220 whether the GSM operation is globally visible, i.e., the task determines when a read operation returns the result of the GSM operation or that of a subsequent operation. A globally visible GSM operation requires a different notification from a locally visible GSM operation. Thus, the above determination is essential to determining the type of notification required on completion of the GSM operation.

When the GSM operations is a globally visible operation or has been made globally visible at the target, the task provides a first type notification indicating that the GSM operation has been made globally visible at the target, as shown at block 1222. The notification provided by the task may take the form of either separate notification records (which contain sufficient information to match the notification with the initiating request), which are inserted in a FIFO buffer. Alternatively, the notification may take the form of a notification which is stored in a designated location in memory that is atomically updated using instructions such as those in the set {ADD, AND, OR, XOR, COMPARE_AND_SWAP, FETCH&OP}. If no global notification is required, the task performs a local notification, as shown at block 1223.

When the GSM operations requires a make globally visible notification, the notification (or command for the notification) is placed in the task's send FIFO, as shown at block 1224. The HFI then issues the notification to the fabric, at block 1226, from which the notification becomes globally visible. With the notification issued, the HFI removes the notification tag of the GSM operation from within the HFI window of the task, as shown at block 1228, and the process ends at block 1230. Thus, in addition to notification of delivery, the target task also provides notification of completion of the GSM operation at the target node.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing local notification of completion of a global shared memory (GSM) operation processed by a local task executing at a local node of a distributed system having multiple nodes on which different tasks of a single job execute and perform GSM operations received from a second task via a host fabric interface (HFI) and associated HFI window assigned to the local task for handling transmission of, the method comprising:

a local task executing on a processor initiating execution of a GSM operation from an HFI window mapped to the local task executing on the processor on the local node, wherein the HFI window provides a task-level view into hardware of the local node and enables launching of GSM commands in address space assigned to the local task;

checking a header of a GSM message that provided the GSM operation for a notification metric that indicates whether the notification is to be completed locally or globally;

detecting a completion of an execution of the GSM operation on the local node;

the local task issuing a notification that indicates to other locally executing tasks that the GSM operation is locally completed; and removing the GSM operation from a list of operations within the HFI window.

2. The method of claim 1, further comprising:
in response to the notification metric indicating the notification should be issued globally, placing the notification in a send FIFO to be transmitted to one or more of the multiple nodes via an interconnect fabric.

3. The method of claim 1, wherein said detecting a completion further comprises monitoring for the completion of the GSM operation, and wherein the notification is issued to the HFI.

4. The method of claim 2, further comprising:
retrieving the GSM message from a receive FIFO, wherein a GSM notification metric is provided by the HFI when the GSM message is received.

5. A processing node within a distributed data processing system comprising:
a processing unit with an initiating task executing thereon, said initiating task being a local task of a distributed job with multiple tasks executing at different nodes across a global shared memory (GSM) environment;
a local memory coupled to the processing unit; and
a host fabric interface (HFI) including a window assigned to the initiating task and processing logic for providing local notification of completion of a global shared memory (GSM) operation processed by a local task executing at a local node of a distributed system having multiple nodes on which different tasks of a single job execute and perform GSM operations received from a second task via a host fabric interface (HFI) and associated HFI window assigned to the local task for handling transmission of, wherein the processing logic comprises logic that:
initiates execution of a GSM operation from an HFI window mapped to a local task on the local node, wherein the HFI window provides a task-level view into hardware of the local node and enables launching of GSM commands in address space assigned to the local task;
checks a header of a GSM message that provided the GSM operation for a notification metric that indicates whether the notification is to be completed locally or globally;
detects a completion of an execution of the GSM operation on the local node;
issues a notification that indicates to other locally executing tasks that the GSM operation is locally completed; and
removes the GSM operation from a list of operations within the HFI window.

6. The processing node of claim 5, said processing logic further comprising logic that:
in response to the notification metric indicating the notification should be issued globally, places the notification in a send FIFO to be transmitted to one or more of the multiple nodes via an interconnect fabric.

7. The processing node of claim 5, said processing logic that detects a completion further comprises logic that monitors for the completion of the GSM operation, and wherein the notification is issued to the HFI.

8. The processing node of claim 5, wherein said processing logic further comprises logic that retrieves the GSM message from a receive FIFO, wherein the GSM notification metric is provided by the HFI when the GSM message is received.

9. A computer program product comprising:
a machine readable storage medium; and
program code on the machine readable storage medium for providing local notification of completion of a global shared memory (GSM) operation processed by a local task executing at a local node of a distributed system having multiple nodes on which different tasks of a single job execute and perform GSM operations received from a second task via a host fabric interface (HFI) and associated HFI window assigned to the local task for handling transmission of, wherein said program code further comprises code that provides the function of:
a local task initiating execution of a GSM operation from an HFI window mapped to the local task on the local node, wherein the HFI window provides a task-level view into hardware of the local node and enables launching of GSM commands in address space assigned to the local task;
checking a header of a GSM message that provided the GSM operation for a notification metric that indicates whether the notification is to be completed locally or globally;
detecting a completion of an execution of the GSM operation on the local node;
the local task issuing a notification that indicates to other locally executing tasks that the GSM operation is locally completed; and
removing the GSM operation from a list of operations within the HFI window.

10. The computer program product of claim 9, further comprising program code for:
in response to the notification metric indicating the notification should be issued globally, placing the notification in a send FIFO to be transmitted to one or more of the multiple nodes via an interconnect fabric.

11. The computer program product of claim 9, wherein said program code for detecting a completion further comprises program code for monitoring for the completion of the GSM operation, and wherein the notification is issued to the HFI.

12. The computer program product of claim 9, further comprising program code for retrieving the GSM message from a receive FIFO, wherein the GSM notification metric is provided by the HFI when the GSM message is received.

* * * * *